US012013915B2

(12) United States Patent
Achan et al.

(10) Patent No.: US 12,013,915 B2
(45) Date of Patent: *Jun. 18, 2024

(54) WHOLE PAGE PERSONALIZATION WITH CYCLIC DEPENDENCIES

(71) Applicant: Walmart Apollo, LLC, Bentonville, AR (US)

(72) Inventors: Kannan Achan, Saratoga, CA (US); Evren Korpeoglu, San Jose, CA (US); Shirpaa Manoharan, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,327

(22) Filed: Jan. 30, 2023

(65) Prior Publication Data

US 2023/0169137 A1    Jun. 1, 2023

Related U.S. Application Data

(63) Continuation of application No. 17/073,202, filed on Oct. 16, 2020, now Pat. No. 11,609,964, which is a
(Continued)

(51) Int. Cl.
G06F 16/00     (2019.01)
G06F 16/957    (2019.01)
G06Q 30/00     (2023.01)

(52) U.S. Cl.
CPC ......... *G06F 16/9577* (2019.01); *G06Q 30/00* (2013.01)

(58) Field of Classification Search
CPC ............. G06F 16/9577; G06F 16/9024; G06F 16/958; G06Q 30/00; G06Q 10/067;
(Continued)

(56) References Cited

U.S. PATENT DOCUMENTS 6,237,006 B1   5/2001   Weinberg
7,072,888 B1   7/2006   Perkins
(Continued)

FOREIGN PATENT DOCUMENTS

JP   2004280361 A   10/2004
JP   2008299370 A    9/2016
WO      9852011     11/1998

OTHER PUBLICATIONS

J. Zhu et al., "Dynamic Hierarchical Markov Random Fields for Integrated Web Data Extraction," Journal of Machine Learning Research 9 (2008) pp. 1583-1614, Jul. 2008 Jul. 2008.
(Continued)

*Primary Examiner* — Syed H Hasan
(74) *Attorney, Agent, or Firm* — BRYAN CAVE LEIGHTON PAISNER LLP

(57) ABSTRACT

A system including one or more processors and one or more non-transitory computer-readable media storing computing instructions that, when run on the one or more processors, cause the one or more processors to perform functions including: reconfiguring a webpage as an undirected graph; identifying a cyclic dependency in the undirected graph; iterating processing one or more inferences over the cyclic dependency for each pair of the nodes of the set of the nodes; breaking one or more of edges of the undirected graph; determining, based at least in part on compatibility functions of the one or more edges remaining after breaking the one or more of the edges, a probability of the webpage having exceeded a predetermined threshold to cause a user to take an action; and sending instructions to display the webpage. Other embodiments are described.

20 Claims, 11 Drawing Sheets

Related U.S. Application Data continuation-in-part of application No. 16/525,298, filed on Jul. 29, 2019, now Pat. No. 11,194,875, which is a continuation of application No. 15/420,757, filed on Jan. 31, 2017, now Pat. No. 10,366,133.

(58) Field of Classification Search
CPC ............ G06Q 30/0241; G06Q 30/0277; H04L 67/02; H04L 67/306
See application file for complete search history.

(56) References Cited

U.S. PATENT DOCUMENTS

| | | | |
|---|---|---|---|
| 7,752,054 | B1 | 7/2010 | Anthony-Hoppe et al. |
| 7,801,885 | B1 | 9/2010 | Verma |
| 7,827,170 | B1 | 11/2010 | Horling et al. |
| 7,974,934 | B2 | 7/2011 | Ravikumar et al. |
| 8,494,832 | B2 | 7/2013 | Krishnan et al. |
| 9,047,870 | B2 | 6/2015 | Ballinger et al. |
| 10,002,368 | B1 | 6/2018 | Els et al. |
| 10,037,357 | B1 | 7/2018 | Donaker et al. |
| 11,062,371 | B1 | 7/2021 | Yin et al. |
| 2002/0002538 | A1 | 1/2002 | Ling |
| 2003/0100931 | A1 | 5/2003 | Mullett |
| 2003/0149937 | A1 | 8/2003 | McElfresh et al. |
| 2003/0221162 | A1 | 11/2003 | Sridhar |
| 2005/0102202 | A1 | 5/2005 | Linden et al. |
| 2005/0125382 | A1 | 6/2005 | Karnawat et al. |
| 2005/0222989 | A1 | 10/2005 | Haveliwala et al. |
| 2006/0204142 | A1 | 9/2006 | West et al. |
| 2007/0192166 | A1 | 8/2007 | Van Luchene |
| 2008/0162268 | A1 | 7/2008 | Gilbert |
| 2008/0235162 | A1 | 9/2008 | Spring |
| 2008/0243638 | A1 | 10/2008 | Chan |
| 2009/0044106 | A1 | 2/2009 | Berkner et al. |
| 2009/0248608 | A1 | 10/2009 | Ravikumar et al. |
| 2009/0307002 | A1 | 12/2009 | Costanzo et al. |
| 2010/0106595 | A1 | 4/2010 | Baugher |
| 2010/0125573 | A1 | 5/2010 | Venolia |
| 2010/0250714 | A1 | 9/2010 | Wehrmann et al. |
| 2011/0035379 | A1 | 2/2011 | Chen |
| 2011/0066957 | A1* | 3/2011 | Prats .................... H04L 67/146 709/204 |
| 2011/0078554 | A1 | 3/2011 | Nie et al. |
| 2011/0184806 | A1 | 7/2011 | Chen et al. |
| 2011/0238478 | A1 | 9/2011 | Gottfurcht et al. |
| 2011/0307411 | A1 | 12/2011 | Bolivar et al. |
| 2012/0036123 | A1 | 2/2012 | Hasan et al. |
| 2012/0042232 | A1 | 2/2012 | Brelsford et al. |
| 2012/0143789 | A1 | 6/2012 | Wang et al. |
| 2012/0173338 | A1 | 7/2012 | Ariel et al. |
| 2012/0226562 | A1 | 9/2012 | Baum et al. |
| 2012/0284275 | A1 | 11/2012 | Vadrevu et al. |
| 2012/0317088 | A1 | 12/2012 | Pantel et al. |
| 2013/0013448 | A1 | 1/2013 | Bradley et al. |
| 2013/0047062 | A1 | 2/2013 | McElfresh et al. |
| 2013/0047063 | A1* | 2/2013 | McElfresh ......... G06Q 30/0273 715/205 |
| 2013/0073390 | A1 | 3/2013 | Konig et al. |
| 2013/0282682 | A1 | 10/2013 | Batraski et al. |
| 2014/0040300 | A1 | 2/2014 | Narayanan |
| 2014/0122464 | A1 | 5/2014 | Arunachalam et al. |
| 2014/0149399 | A1 | 5/2014 | Kurzion |
| 2014/0279233 | A1 | 9/2014 | Lau et al. |
| 2014/0279993 | A1 | 9/2014 | Bernhardt et al. |
| 2014/0304278 | A1 | 10/2014 | Kleiman et al. |
| 2014/0337171 | A1 | 11/2014 | Sivashanmugam et al. |
| 2014/0372873 | A1* | 12/2014 | Leung .................. G06F 16/958 715/243 |
| 2015/0007064 | A1 | 1/2015 | Givoni |
| 2015/0046841 | A1 | 2/2015 | Sharon et al. |
| 2015/0066597 | A1 | 3/2015 | Givoni |
| 2015/0127439 | A1 | 5/2015 | Campos de Figueiredo Faceira et al. |
| 2015/0206199 | A1 | 7/2015 | Zhang |
| 2016/0035234 | A1 | 2/2016 | Choi et al. |
| 2016/0140130 | A1 | 5/2016 | Smirnov et al. |
| 2016/0140626 | A1 | 5/2016 | Agarwal et al. |
| 2016/0232575 | A1 | 8/2016 | Kirti et al. |
| 2016/0306798 | A1 | 10/2016 | Guo et al. |
| 2016/0321716 | A1 | 11/2016 | Ravikant et al. |
| 2016/0349928 | A1 | 12/2016 | Li et al. |
| 2017/0026703 | A1 | 1/2017 | Phadnis |
| 2017/0171580 | A1 | 6/2017 | Hirsch et al. |
| 2017/0223406 | A1 | 8/2017 | Kaliamoorthi et al. |
| 2017/0300573 | A1* | 10/2017 | He ....................... G06F 16/951 |
| 2018/0060936 | A1 | 3/2018 | Gupta et al. |
| 2018/0096399 | A1 | 4/2018 | Delayen et al. |
| 2018/0108093 | A1 | 4/2018 | Podgorny et al. |
| 2018/0181569 | A1 | 6/2018 | Jarr et al. |
| 2019/0042981 | A1 | 2/2019 | Bendfeldt |
| 2019/0205472 | A1 | 7/2019 | Kulkarni |
| 2020/0152184 | A1 | 5/2020 | Steedman Henderson et al. |
| 2021/0117935 | A1 | 4/2021 | Fineman et al. |

OTHER PUBLICATIONS

E. Callerstrom and K. Elfstrom, "Multipurpose Scheduling of Synchronous Data Flow Graphs Using Local Search Algorithms," KTH Information and Communication Technology, Ex. I. Sander, 68 pages, 2014 2014.

S. Chen and S. Smith, "Introducing a New Advantage of Crossover: Commonality-Based Selection," Published Jun. 9, 1999, GECCO Conference Jun. 9, 1999.

Chung et al., "Deep Neural Network Using Trainable Activation Functions," Electronics and Telecommunications Research Institute, 2016. 2016.

Chen et al., "An Optimization Model for Product Placement on Product Listing Pages" 2014.

Elwany et al., "The Layout Problem: Investigation and Aggregation of Artificial Intelligence and Optimization Techniques" 2006.

Slawski, B., "Query Refinements Have Changed Since the Earlier Days of Google" 2017.

Suchacka et al. Using association rules to assess purchase probability in online stores. (Year 2016) Sep. 6, 2016.

W. Reinartz and P. Saffert, "Creativity in Advertising: When It Works and When It Doesn't," 2013 (Year: 2013) 2013.

* cited by examiner

500

505 – Modeling a webpage as a random field, wherein the random field comprises an undirected graph, the undirected graph comprising: one or more nodes; and one or more edges, each edge of the one or more edges is between two different nodes of the one or more nodes.

510 - Determining a probability of the webpage having exceeded a predetermined threshold based at least in part on the one or more compatibility functions.

515 - Determining a first placement of the one or more placements of a first webpage module of the one or more webpage modules.

520 - Determining a second placement of the one or more placements of a second webpage module of the one or more webpage modules.

525 - Facilitating a display of the webpage based at least in part on the probability of the webpage.

FIG. 5

WHOLE PAGE PERSONALIZATION WITH CYCLIC DEPENDENCIES

CROSS-REFERENCE TO RELATED APPLICATIONS

This application is a continuation of U.S. application Ser. No. 17/073,202, which is a continuation-in-part of U.S. application Ser. No. 16/525,298 filed Jul. 29, 2019, now U.S. Pat. No. 11,194,875, which is a continuation of U.S. application Ser. No. 15/420,757, filed Jan. 31, 2017, now U.S. Pat. No. 10,366,133. U.S. application Ser. Nos. 17/073,202, 16/525,298 and 15/420,757 and U.S. Pat. Nos. 10,366,133 and 11,194,875 are incorporated herein by reference in their entirety.

TECHNICAL FIELD

This disclosure relates generally to systems for whole page personalization with cyclic dependencies, and related methods.

BACKGROUND

System bandwidth can become slow or bottlenecked when retrieving search results for a search query. Many times, when a user of a web site, such as an eCommerce website, has difficulty finding an item, the user can conduct numerous user actions and/or item activities (e.g., clicking on one or more items or entering new search terms). These user actions and/or item activities can decrease the efficiency of a system by increasing the amount of item information retrieved from a database. The ability to personalize a webpage and/or website experience can decrease the demand on system resources and improve user experience. Accordingly, there is a need for systems and methods to provide for whole page personalization.

BRIEF DESCRIPTION OF THE DRAWINGS

To facilitate further description of the embodiments, the following drawings are provided in which:

FIG. 5 illustrates is a flowchart for a method, according to an embodiment;

Figure 1:
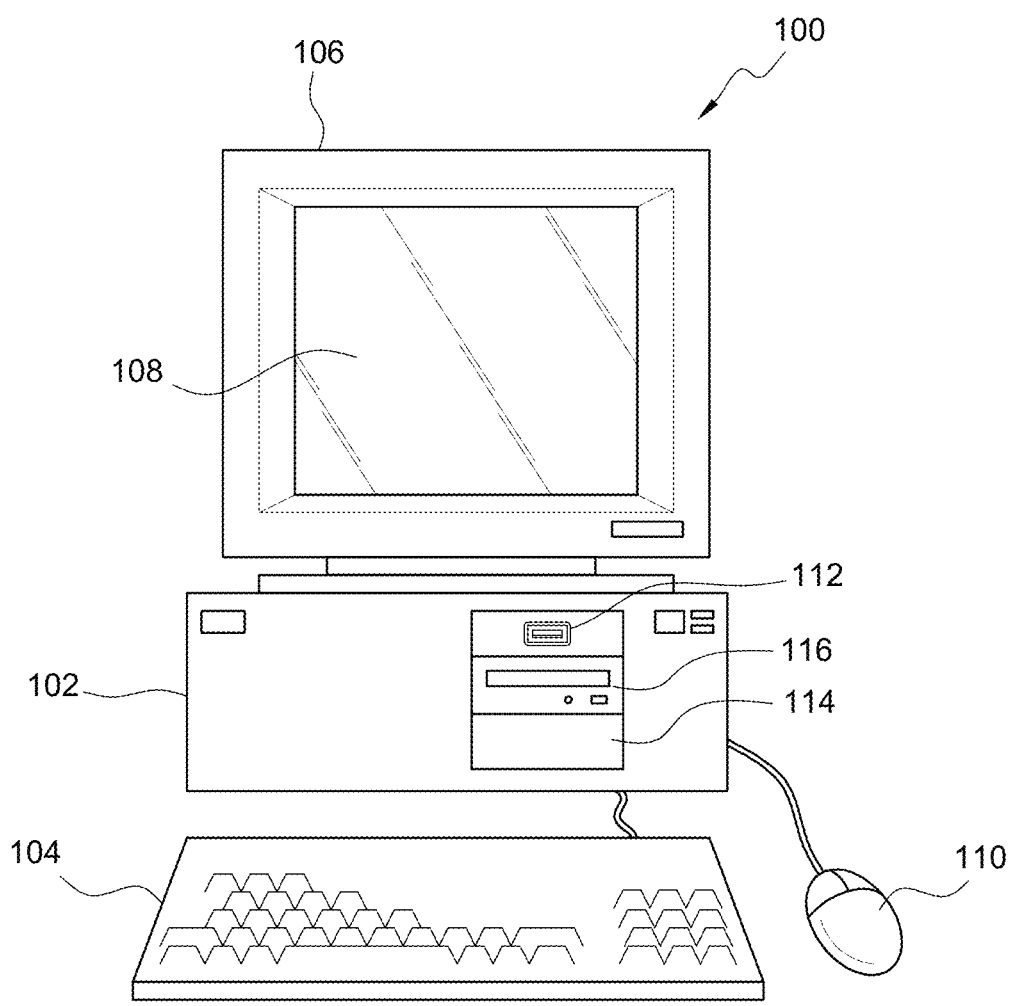
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. In many embodiments, the system can comprise one or more processing modules and one or more non-transitory storage modules storing computing instructions configured to run on the one or more processing modules and perform acts. In many embodiments, the acts can comprise modeling a webpage as a random field, wherein the random field comprises an undirected graph. In some embodiments, the undirected graph can comprise one or more nodes and one or more edges, wherein each edge of the one or more edges is between two different nodes of the one or more nodes, each node of the one or more nodes comprises one or more placements on the webpage and a goodness function of one or more goodness functions associated with one or more webpage modules, and each edge of the or one more edges comprises a compatibility function based at least in part on the one or more goodness functions of the two different nodes of the one or more nodes associated with each edge of the one or more edges. In many embodiments, the acts further can comprise determining a probability of the webpage having exceeded a predetermined threshold based at least in part on the one or more compatibility functions by determining a first placement of the one or more placements of a first webpage module of the one or more webpage modules and determining a second placement of the one or more placements of a second webpage module of the one or more webpage modules. In various embodiments, the one or more webpage modules can comprise an advertisement, a search recommendation, or an item recommendation. In some embodiments, the acts further can comprise facilitating a display of the webpage based at least in part on the probability of the webpage.

Many embodiments can comprise a method. In some embodiments, the method can comprise modeling a webpage as a random field, wherein the random field comprises an undirected graph. In some embodiments, the undirected graph can comprise one or more nodes and one or more edges, wherein each edge of the one or more edges is between two different nodes of the one or more nodes, each node of the one or more nodes comprises one or more placements on the webpage and a goodness function of one or more goodness functions associated with one or more webpage modules, and each edge of the or one more edges comprises a compatibility function based at least in part on the one or more goodness functions of the two different nodes of the one or more nodes associated with each edge of the one or more edges. In many embodiments, the acts further can comprise determining a probability of the webpage having exceeded a predetermined threshold based at least in part on the one or more compatibility functions by determining a first placement of the one or more placements of a first webpage module of the one or more webpage modules and determining a second placement of the one or more placements of a second webpage module of the one or more webpage modules. In various embodiments, the one or more webpage modules can comprise an advertisement, a search recommendation, or an item recommendation. In some embodiments, the acts further can comprise facilitating a display of the webpage based at least in part on the probability of the webpage.

A number of embodiments comprise a method. In some embodiments, the method can comprise receiving a search query from a user and modeling a webpage as a random field. In many embodiments, the random field can comprise an undirected graph. In some embodiments, the undirected graph can comprise one or more nodes and one or more edges, wherein each edge of the one or more edges is between two different nodes of the one or more nodes, each node of the one or more nodes can comprise one or more placements on the webpage and a goodness function of one or more goodness functions associated with one or more webpage modules, and each edge of the or one more edges comprises a compatibility function based at least in part on the one or more goodness functions of the two different nodes of the one or more nodes associated with each edge of the one or more edges. In many embodiments, the method further can comprise determining a probability of the webpage having exceeded a predetermined threshold based at least in part on the one or more compatibility functions by determining a first placement of the one or more placements of a first webpage module of the one or more webpage modules and determining a second placement of the one or more placements of a second webpage module of the one or more webpage modules. In some embodiments, the one or more webpage modules can comprise an advertisement associated with the search query a search recommendation with the search query, or an item recommendation with the search query. In various embodiments, the method further can comprise facilitating a display of the webpage based at least in part on the probability of the webpage.

A number of embodiments include a system. The system can include one or more processors and one or more non-transitory computer-readable media storing computing instructions configured to run on the one or more processors and perform certain acts. The acts can include modeling a webpage as a random field. The random field can include an undirected graph including two or more nodes and one or more edges. Each node of the two or more nodes can include one or more placements on the webpage and can include a goodness function of one or more goodness functions associated with one or more webpage elements. Each edge of the one or more edges can include a compatibility function based at least in part on one or more goodness functions of two different nodes of the two or more nodes associated with each edge of the one or more edges. The acts also can include determining a probability of the webpage having exceeded a predetermined threshold based at least in part on one or more of the compatibility functions of the one or more edges. The acts further can include sending instructions to display the webpage based at least in part on the probability of the webpage having exceeded the predetermined threshold.

Various embodiments include a method. The method can include modeling a webpage as a random field. The random field can include an undirected graph including two or more nodes and one or more edges. Each node of the two or more nodes can include one or more placements on the webpage and can include a goodness function of one or more goodness functions associated with one or more webpage elements. Each edge of the one or more edges can include a compatibility function based at least in part on the one or more goodness functions of two different nodes of the two or more nodes associated with each edge of the one or more edges. The method also can include determining a probability of the webpage having exceeded a predetermined threshold based at least in part on one or more of the compatibility functions of the one or more edges. Additionally, the method further can include sending instructions to display the webpage based at least in part on the probability of the webpage having exceeded the predetermined threshold.

A number of embodiments can include a system including one or more one or more processors and one or more non-transitory computer-readable media storing computing instructions configured to run on the one or more processors and perform certain acts. The acts can include modeling a webpage as a random field. The random field can include an undirected graph including nodes and edges. The acts also can include identifying a cyclic dependency in the undirected graph. The cyclic dependency can involve at least three of the nodes. The acts additionally can include breaking one or more of the edges of the undirected graph that connects the at least three of the nodes in the cyclic dependency. The acts also can include determining a probability of the webpage having exceeded a predetermined threshold based on compatibility functions of the edges, as updated. The acts also can include ending instructions to display the webpage based at least in part on the probability of the webpage having exceeded the predetermined threshold.

Various embodiments can include a method being implemented via execution of computing instructions configured to run on one or more processors and stored at one or more non-transitory computer-readable media. The method can include modeling a webpage as a random field. The random field can include an undirected graph including nodes and edges. The method also an include identifying a cyclic dependency in the undirected graph. The cyclic dependency can involve at least three of the nodes. The method further can include breaking one or more of the edges of the undirected graph that connects the at least three of the nodes in the cyclic dependency. The method additionally can include determining a probability of the webpage having exceeded a predetermined threshold based on compatibility functions of the edges, as updated. The method also can include sending instructions to display the webpage based at least in part on the probability of the webpage having exceeded the predetermined threshold.

A number of embodiments include a system. The system including one or more processors and one or more non-transitory computer-readable media storing computing instructions that, when run on the one or more processors, cause the one or more processors to perform certain acts. The acts can include reconfiguring a webpage as an undirected graph. The acts also can include identifying a cyclic dependency in the undirected graph. The cyclic dependency can include a set of nodes of the undirected graph. The acts further can include iterating processing one or more inferences over the cyclic dependency for each pair of the nodes of the set of the nodes. The acts additionally can include breaking one or more of edges of the undirected graph. The one or more edges couple together the set of the nodes. The acts further can include determining, based at least in part on compatibility functions of the one or more edges remaining after breaking the one or more of the edges, a probability of the webpage having exceeded a predetermined threshold to cause a user to take an action. The acts also can include sending instructions to display the webpage.

Various embodiments include a method. The method being implemented via execution of computing instructions configured to run on one or more processors and stored on one or more non-transitory computer-readable media. The method can include reconfiguring a webpage as an undirected graph. The method also can include identifying a cyclic dependency in the undirected graph. The cyclic dependency can include a set of nodes of the undirected graph. The method further can include iterating processing one or more inferences over the cyclic dependency for each pair of the nodes of the set of the nodes. The method additionally can include breaking one or more of edges of the undirected graph. The one or more edges couple together the set of the nodes. The method further can include determining, based at least in part on compatibility functions of the one or more edges remaining after breaking the one or more of the edges, a probability of the webpage having exceeded a predetermined threshold to cause a user to take an action. The method also can include sending instructions to display the webpage.

Figure 2:
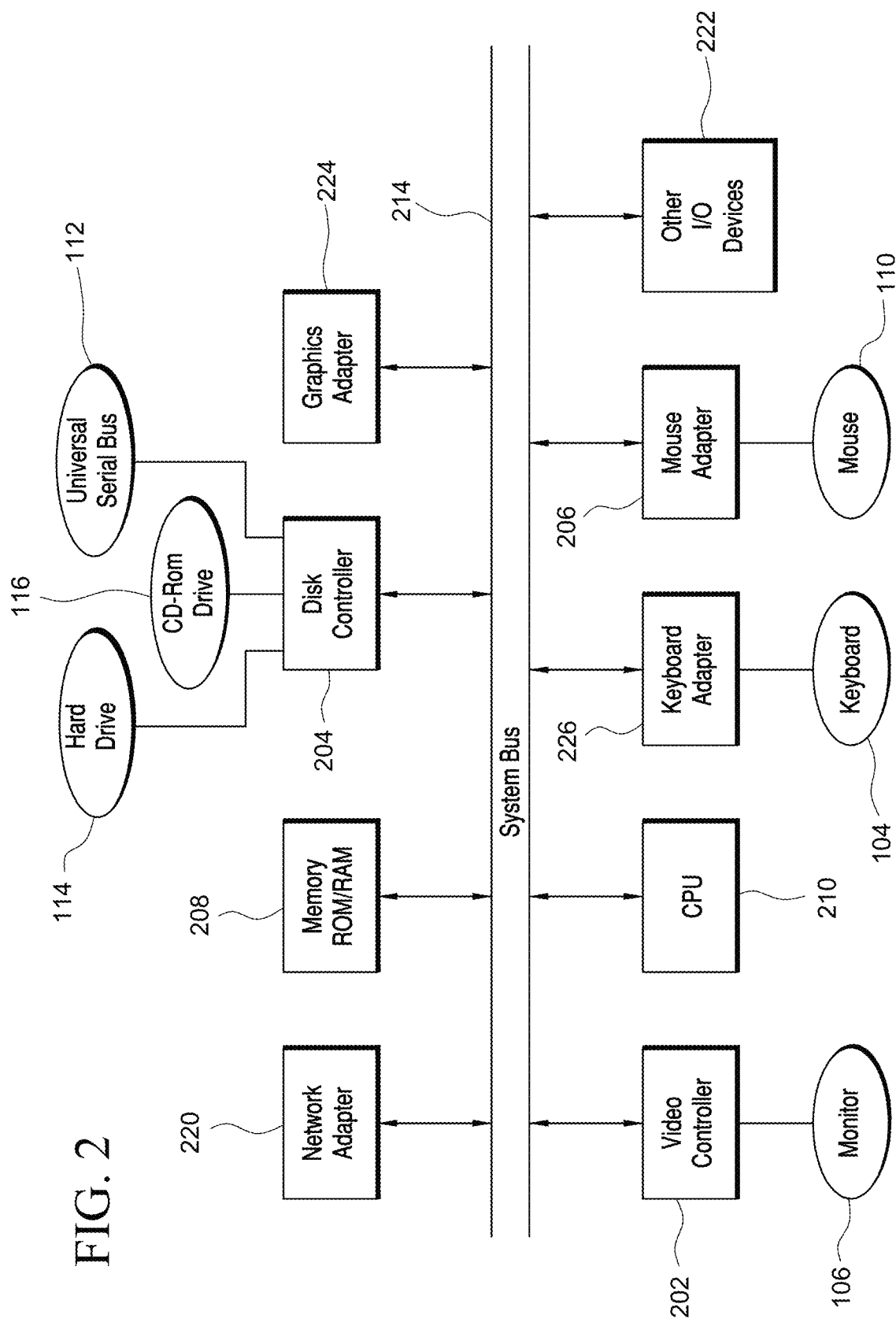
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with a CD-ROM and/or DVD drive 116 (FIGS. 1-2), floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
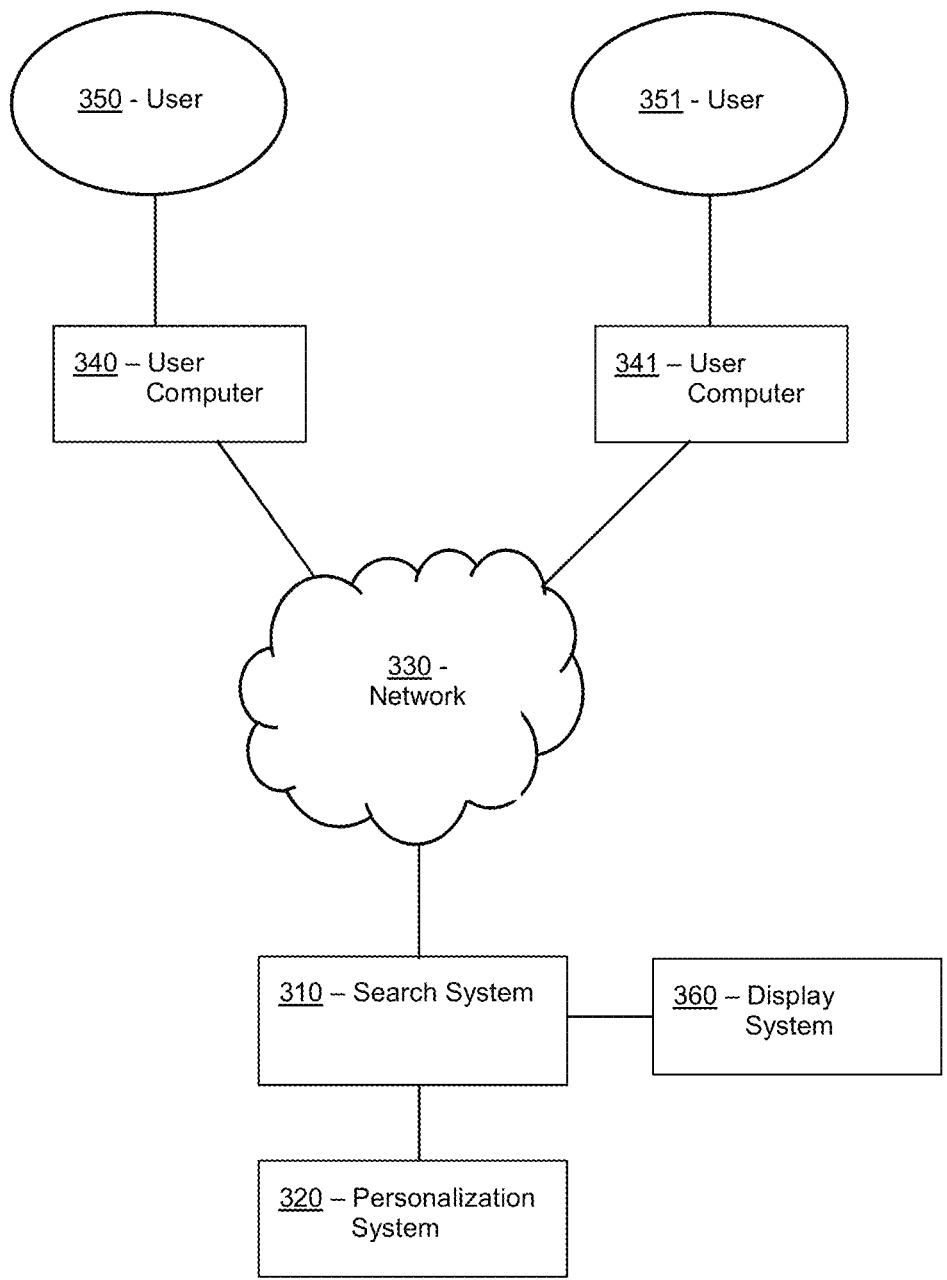
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise a search system 310, a personalization system 320, and a display system 360. In some embodiments, search system 310, personalization system 320, and display system 360 can each be a computer system 100 (FIG. 1), as described above, and can each be a single computer, a single server, or a cluster or collection of computers or servers. In some embodiments, search system 310 and/or personalization system 320 can be in communication with an inventory database (not shown) which can track distinct items (e.g., stock keeping units (SKUs)), and images of the distinct items, in a product catalog, which can be ordered through the online retailer and which can be housed at one or more warehouses. In many embodiments, warehouses can comprise brick-and-mortar stores, distribution centers, and/or other storage facilities.

In many embodiments, search system 310, personalization system 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of search system 310, personalization system 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of search system 310, personalization system 320, and/or display system 360. In a similar manner, the processing module(s) and the memory storage module(s) can be local and/or remote to each other.

In many embodiments, search system 310 and/or display system 360 can be configured to communicate with one or more user computers 340 and 341. In some embodiments, user computers 340 and 341 also can be referred to as customer computers. In some embodiments, search system 310 and/or display system 360 can communicate or interface (e.g. interact) with one or more customer computers (such as user computers 340 and 341) through a network 330. In some embodiments, network 330 can be an internet, an intranet that is not open to the public, an email system, and/or a texting system. In many embodiments, network 330 can comprise one or more electronic transmission channels. In many embodiments, the electronic transmission channels can comprise an email, a text message, and/or an electronic notice or message. Accordingly, in many embodiments, search system 310 and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, search system 310, personalization system 320, and/or display system 360 also can be configured to communicate with one or more databases. The one or more database can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between search system 310, personalization system 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Turning ahead in the drawings, FIG. 5 illustrates a flow chart for a method 500, according to an embodiment.

Figure 4:
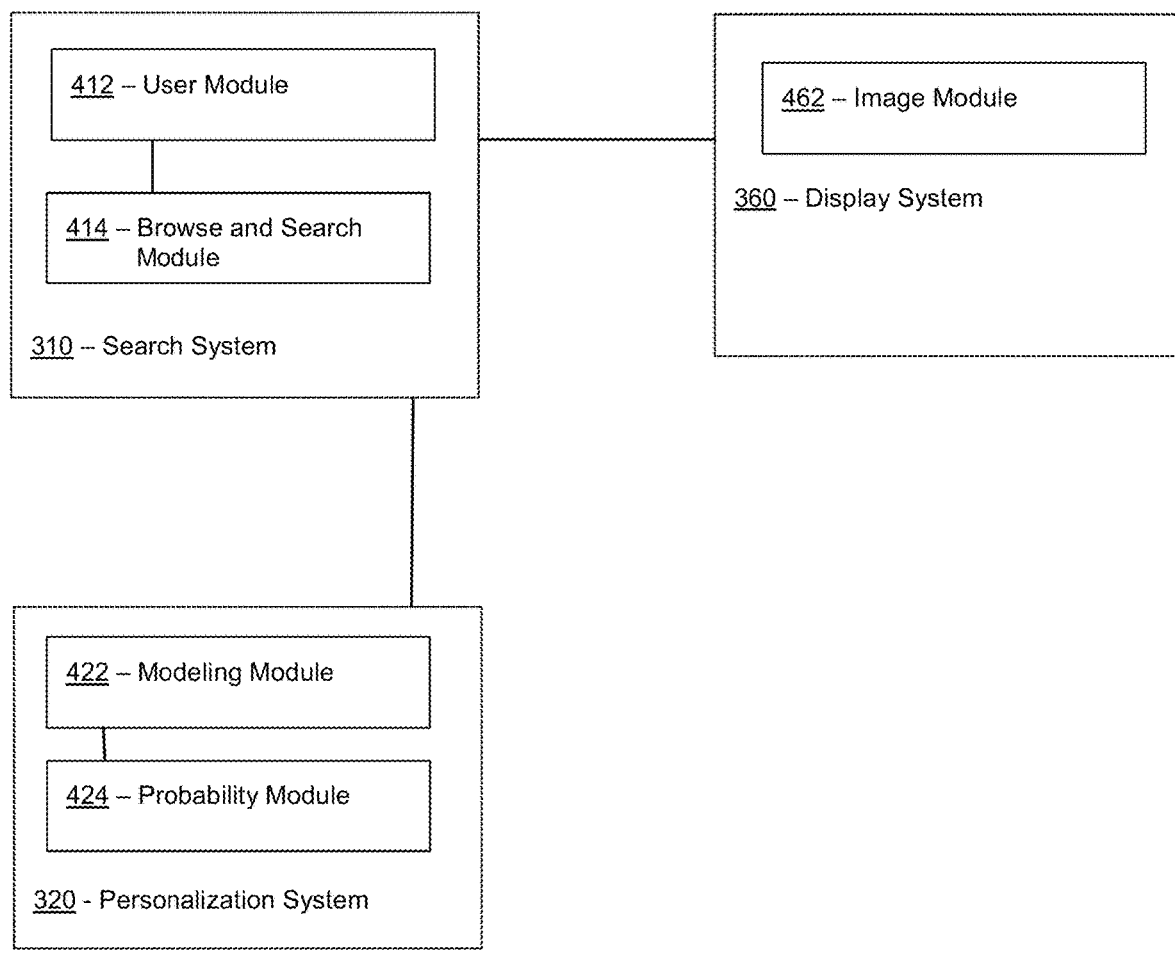
FIG. 4 illustrates a representative block diagram of a portion of the system of FIG. 3, according to an embodiment.

Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 412, 414, 422, 424, and/or 462 (FIG. 4). Such non-transitory memory storage modules can be part of a computer system such as search system 310 (FIGS. 3 & 4), personalization system 320 (FIGS. 3 & 4), and/or display system 360 (FIGS. 3 & 4). The processing module(s) can be similar or identical to the processing module(s) described above with respect to computer system 100 (FIG. 1).

In many embodiments, method 500 can be a method of whole page personalization to personalize a web page based on user intent, information from a search query (e.g., search terms) and/or other item activity. For example, method 500 can comprise an activity 505 of modeling a webpage as a random field, wherein the random field comprises an undirected graph. In some embodiments, activity 505 can comprise a maximum entropy model. In many embodiments, the undirected graph can comprise one or more nodes and one or more edges. In many embodiments, each edge of the one or more edges is between two different nodes of the one or more nodes, and each node of the one or more nodes can comprise one or more placements on the webpage and a goodness function of one or more goodness functions associated with one or more webpage modules. In some embodiments, the goodness function can comprise a probabilistic model learnt from historical session data (e.g., historical data described below). In many embodiments, each edge of the or one more edges can comprise a compatibility function based at least in part on the one or more goodness functions of the two different nodes of the one or more nodes associated with each edge of the one or more edges. In some embodiments, the compatibility function can comprise a probabilistic model learnt from historical session data (e.g., historical data described below). In some embodiments, activity 505 can comprise using item activity statistics from the user and/or other users (e.g., page views, item clicks, item add-to-carts, and/or item purchases) in a taxonomy (e.g., Baby, Baby/Nursery, Baby/Nursery/Furniture, Baby/Nursery/Furniture/Cribs). In many embodiments, each of the item activity statistics can be computed across various time resolutions (e.g., over a year, 6 months, month, week, day and/or hour). Such temporal features can provide additional information to the modeling of the undirected graph (e.g., a purchase of a television in the last 30 days is different from buying a consumable in the last month, as the consumable offers an opportunity for a replenishment themed campaign, while the former can be a cross sell opportunity (e.g., to promote home theatre systems and console tables)). In many embodiments, activity 505 can further comprise modeling the webpage based at least in part on a user profile (described below) of the user and/or other users.

In many embodiments, method 500 can further comprise an activity 510 of determining a probability of the webpage having exceeded a predetermined threshold to likely cause a user to take an action (e.g., view a product on the webpage, click on the product on the webpage, add the product to a checkout cart, and/or purchase the product) based at least in part on the one or more compatibility functions. In some embodiments, activity 510 can comprise determining a probability of the webpage having exceeded a predetermined threshold based at least in part on the one or more compatibility functions by: activity 515 of determining a first placement of the one or more placements of a first webpage module of the one or more webpage modules; and activity 520 determining a second placement of the one or more placements of a second webpage module of the one or more webpage modules. In many embodiments, the one or more webpage modules can comprise an advertisement, an advertisement banner, a header message, a point of view, a vertical banner, an item carousel, a search recommendation, or an item recommendation.

In some embodiments, the one or more placements comprise contiguous placements of the one or more webpage modules on the webpage. In some embodiments, activity 510 further can comprise determining approximately 1-100 additional placements of the one or more placements of one or more additional webpage modules of the one or more webpage modules. In many embodiments, the one or more placements comprise contiguous placements of the one or more webpage modules on the webpage. In some embodiments, the predetermined threshold can be based at least in part on the compatibility score of each of the one or more edges. In some embodiments, the predetermined threshold comprises a compatibility score of at least approximately 0.5 or 50%. In some embodiments, the compatibility score of each the one or more edges can be based at least in part on an engagement value, the engagement value comprising at least one of: a click rate (e.g., a rate at which the user clicks on one or more items on the webpage), a bounce rate (e.g., a rate at which the user leaves a webpage to go to a different webpage, or a rate at which the user leaves one or more items such as clicking a first item and then leaving the first item by clicking a second item), an add to cart rate (e.g., a rate at which the user adds an item to cart after viewing the item), or a purchase rate (e.g., a rate at which the user purchases the item after viewing it and/or after adding the item to the cart).

In some embodiments, the model of activity 505 can be trained using historical data, (e.g., historical webservice logs) to generate positive and negative samples. In some embodiments, to improve conversion rate (e.g., viewing an item to purchasing the item), positive labels can be used as a set of all sessions which had a conversion related activity in a relevant category after seeing a personalized webpage (e.g., a user was exposed to a personalized electronics experience and buys or adds to cart a camera in the same browse session). In many embodiments, a maximum likelihood estimation can be used to estimate the maximum entropy model. In many embodiments, a preferred parameter configuration can be determined by maximizing a conditional log probability of observing the training data (e.g., the historical data)) x, over the time resolution or time period t:

$$\mathrm{argmax}_w \sum_t \log p(c_t \mid x_i, w) = \mathrm{argmax}_w \sum_t \frac{1}{1 + \exp(-w^\top x)}; \quad \text{(Equation 1)}$$

where $c_t$ is a random variable denoting the desired discrete response, $P(c_t|x_t|w)$ is the probability of seeing the desired response, given observations $x_r$ and the model parameters w, $P(c_r=1|x_r|w)$ is the probability of conversion given observations $x_r$ and model parameters w, and w denotes the model parameters that can be learned from the historical data. In some embodiments, an array of real valued weights can indicate the importance of features (in the array) $x_r$. In many embodiments, in case of conversion, $c_r=1$ would indicate a conversion event, and $c_r=0$ otherwise, In some embodiments, activity 510 of determining the probability of the webpage is further based at least in part on a user profile of the user and/or other users. In various embodiments, the user profile of the user and/or other users can comprise demographic information associated with the related one or more users, likes and dislikes associated with the related one or more users, and/or shopping, pickup, and delivery preferences associated with the related one or more users.

In some embodiments, activity 510 further can comprise determining the probability of the webpage by using the formula in Equation 2:

$$P(\text{page}) = \frac{1}{Z} \prod_i \emptyset_i(x) \prod_{i,j;Edge(i,j)} \varphi_{i,j}(x, y); \quad \text{(Equation 2)}$$

wherein: P(page) is the probability of the webpage, Z is a normalization constant (e.g., a partition function), i is a first node of the one or more nodes, j is a second node of the one or more nodes, x is a first placement of the one or more placements, $\emptyset_i(x)$ is a first goodness function of the one or more goodness functions of the first node at the first placement of the one or more placements, $\Pi_i\emptyset_i(x)$ is the product of the goodness function of the first node, y is a second placement of the one or more placements of the second node of the one or more nodes, $\varphi_{i,j}(x,y)$ is the compatibility function, and $\Pi_{i,j;Edge(i,j)}\varphi_{i,j}(x,y)$ is the product of the compatibility of the first placement of the one or more placements and the second placement of the one or more placements.

Figure 6:
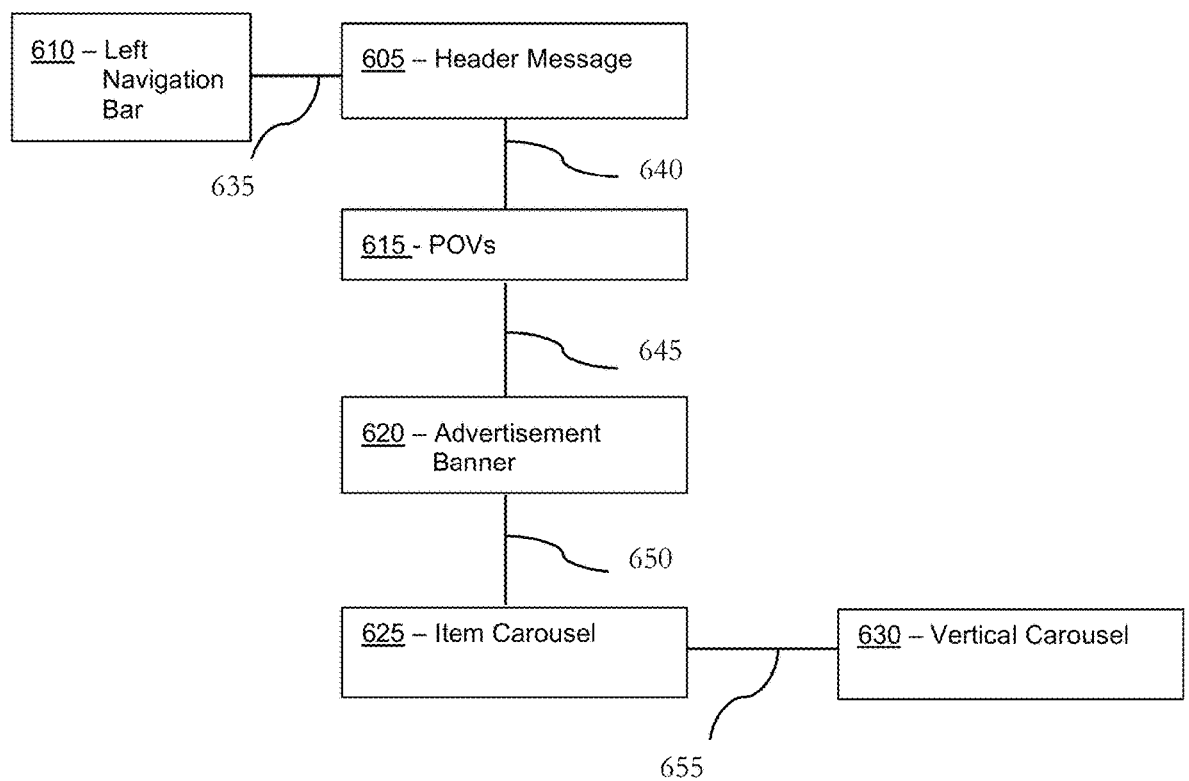
FIG. 6 illustrates an exemplary webpage as a random field, according to an embodiment.

Turning briefly to FIG. 6, FIG. 6 illustrates an exemplary webpage 600 and/or an undirected graph according to many embodiments. In some embodiments, webpage 600 can comprise two or more placements, or available spots, for one or more webpage modules. In some embodiments, for example, from top to bottom and left to right, webpage 600 can comprise a first placement 605, a second placement 610, a third placement 615, a fourth placement 620, a fifth placement 625, and a sixth placement 630. In other embodiments, a webpage (e.g., webpage 600) can comprise 1-100 placements in different configurations. In some embodiments, the one or more placements or nodes of webpage 600 can comprise associated one or more edges between the one or more placements (e.g., edges 635, 640, 645, 650, and 655).

In some embodiments, first placement 605 can comprise a header message webpage module, second placement 610 can comprise a left navigation bar webpage module, third placement 615 can comprise a point of view webpage module, fourth placement 620 can comprise an advertisement banner webpage module, fifth placement 625 can comprise an item carousel webpage module, and sixth placement 630 can comprise a vertical carousel webpage module. In many embodiments, a node of the undirected graph can comprise a website placement (e.g., first placement 605) and a goodness function of one or more goodness functions associated with the webpage module (e.g., header message) of the one or more webpage modules. In many embodiments, each edge between two nodes (e.g., edge 635) comprises a compatibility function based at least in part on the one or more goodness functions of the two different nodes (e.g., first placement 605 and second placement 610) of the one or more nodes associated with each edge of the one or more edges.

Returning to FIG. 5, in many embodiments, method 500 can further comprise an activity 525 of facilitating display of the webpage based at least in part on the probability of the webpage. The one or more webpage modules can be arranged on the webpage pursuant to a ranking of one or more webpage modules, and the ranking can be based, at least in part, on the compatibility score of each of the one or more edges and/or the webpage personalization described herein.

In some embodiments, method 500 can further comprise receiving an affinity score of the user for each of one or more categories (e.g., a specific category in an item taxonomy and/or a custom segment), genders, brands, locations, and/or other custom segments (e.g., an allergy, such as gluten free, and/or preferences, such as organic), the one or more webpage modules comprising the one or more categories. In some embodiments, the affinity score of the user for each of one or more categories can be based at least in part on the user profile of the user and/or recent item activity (e.g., one or more search queries by the user, item clicks by the user, and/or item purchases by the user) of the user.

In many embodiments, method 500 further can comprise receiving a search query from a search from a user. In some embodiments, activity 510 (described above) further can comprise determining the probability of the webpage is further based at least in part on the search query of the user. In some embodiments, the search query is received from the user during a browse session. In some embodiments, the browse session can comprise a time period spent on a website and/or other third party websites. In some embodiments, the time period can be approximately 1 second to approximately 1 hour. In some embodiments, the time period can be the time that the user is logged into a session. In some embodiments, the time period can be from when the user logs into a session to when the user closes a browser. In some embodiments, receiving the search query from the search by the user can comprise receiving the search query during a time window. In some embodiments, the time window can comprise the browse session time period. In some embodiments, the time window can comprise a number of item activities associated with the browse session. In various embodiments, the item activity associated with the browse session can comprise at least one of a view of an item of the item set, a click on the item of the item set, an add-to-cart of the item of the item set, or a purchase of the item of the item set. In a number of embodiments, the time window can comprise a number of actions, subsequent to the search query, associated with item activity associated with the browse session (e.g., a number of clicks on one or more items, a number of views of one or more items, a number of items added to the checkout cart, and/or a number of purchases of one or more items). In some embodiments the number of subsequent actions can comprise a combination of a number of item activities. In some embodiments, the number of subsequent actions can comprise approximately 1 to 100 item activities.

In some embodiments, method 500 further can comprise an activity of receiving one or more previous search queries from a search database, the one or more previous search queries related to the search query. An advantage of the activity of receiving one or more previous search queries from a search database, the one or more previous search queries related to the search query, can comprise expanding a source of information associated with previous search queries for one or more searches related to the search query. The source of information can comprise when an other user searched for a related search query and the item activity associated to the other user's search for the related search query. In some embodiments, the user profile of the user and/or other users can be updated based at least in part on the search query of the user and/or other users.

In some embodiments of method 500, as an example, assuming 3 webpage modules comprising 3 item carousels are to be displayed in a webpage to the user. In many embodiments, the 3 carousels can be selected from a set of category-based item carousels. First, an affinity of the user to all carousels in the set of category-based item carousels can be received from a machine learning algorithm. In many embodiments, the affinity of the user to all carousels in the set of category-based item carousels can be received with the following values:

Apparel 0.01
Auto 0.12
Baby 0.60
Electronics 0.03
Food 0.08
Home 0.02
Household 0.01
Pets 0.01
Toys 0.11
VG (Video Games) 0.01

In the first iteration, method 500 can select the carousel with a highest affinity for the top placement (e.g., first placement 605 (FIG. 6)) which is the "Baby" carousel in this example. For the second placement (e.g., second placement 610 (FIG. 6)), method 500 can find a carousel with a high affinity for the user, and also is compatible with the first selected carousel in the first placement. The compatibility score across categories can be found using a compatibility matrix:

|  | Apparel | Auto | Baby | Electronics | Food | Home | Household | Pets | Toys | VG |
|---|---|---|---|---|---|---|---|---|---|---|
| Apparel | — | 0.1 | 0.25 | 0.1 | 0.05 | 0.15 | 0.1 | 0.1 | 0.05 | 0.1 |
| Auto | 0.1 | — | 0.05 | 0.3 | 0.1 | 0.1 | 0.1 | 0.1 | 0.05 | 0.1 |
| Baby | 0.25 | 0.05 | — | 0.05 | 0.15 | 0.1 | 0.05 | 0.05 | 0.25 | 0.05 |
| Electronics | 0.1 | 0.3 | 0.05 | — | 0.05 | 0.05 | 0.05 | 0.05 | 0.1 | 0.25 |
| Food | 0.05 | 0.1 | 0.15 | 0.05 | — | 0.15 | 0.2 | 0.1 | 0.1 | 0.1 |
| Home | 0.15 | 0.1 | 0.1 | 0.05 | 0.15 | — | 0.2 | 0.15 | 0.05 | 0.05 |
| Household | 0.1 | 0.1 | 0.05 | 0.05 | 0.2 | 0.2 | — | 0.2 | 0.05 | 0.05 |
| Pets | 0.1 | 0.1 | 0.05 | 0.05 | 0.1 | 0.15 | 0.2 | — | 0.15 | 0.1 |
| Toys | 0.05 | 0.05 | 0.25 | 0.1 | 0.1 | 0.05 | 0.05 | 0.15 | — | 0.2 |
| VG | 0.1 | 0.1 | 0.05 | 0.25 | 0.1 | 0.05 | 0.05 | 0.1 | 0.2 | — |

The carousel with highest affinity among the remaining carousels is "Auto," however it has a low compatibility score with "Baby," 0.05. In many embodiments, new affinity scores can be determined by multiplying the first affinity scores with the corresponding compatibility score and normalizing to find the new affinity scores:

Apparel 0.0472
Auto 0.1132
Electronics 0.0283
Food 0.2264
Home 0.0377
Household 0.0094
Pets 0.0094
Toys 0.5189
VG (Video Games) 0.0094

After normalizing, "Toys" carousel has the highest score and selected to be the second carousel to display on the webpage at the second placement. Again iterating once more for the remaining carousels to find a carousel for the third placement, the affinity scores can be updated by considering the compatibility with "Toys":

Apparel 0.0222
Auto 0.2667
Electronics 0.1333
Food 0.3556
Home 0.0444
Household 0.0222
Pets 0.0667
VG (Video Games) 0.0889

Using the prior affinity and compatibility scores, method 500 can comprise selecting the "Food" carousel based on the updated affinity scores.

Returning to FIG. 4, FIG. 4 illustrates a block diagram of a portion of system 300 comprising search system 310, personalization system 320, and/or display system 360, according to the embodiment shown in FIG. 3. Each of search system 310, personalization system 320, and/or display system 360 is merely exemplary and is not limited to the embodiments presented herein. Each of search system 310, personalization system 320, and/or display system 360 can be employed in many different embodiments or examples not specifically depicted or described herein. In some embodiments, certain elements or modules of search system 310, personalization system 320, and/or display system 360 can perform various procedures, processes, and/or acts. In other embodiments, the procedures, processes, and/or acts can be performed by other suitable elements or modules.

In many embodiments, search system 310 can comprise non-transitory memory storage modules 412 and 414, personalization system 320 can comprise non-transitory memory storage modules 422 and 424, and display system 360 can comprise a non-transitory memory storage module 462. Memory storage module 412 can be referred to as a user module 412, and memory storage module 414 can be referred to as a browse and search module 414. Memory storage module 422 can be referred to as a modeling module 422, and memory storage module 424 can be referred to as a probability module. Memory storage module 462 can be referred to as an image module 462.

In many embodiments, user module 412 can store computing instructions configured to run on one or more processing modules and perform one or more acts of methods 500 (FIG. 5) (e.g., activity 505).

In some embodiments, browse and search module 414 can store computing instructions configured to run on one or more processing modules and perform one or more acts of methods 500 (FIG. 5) (e.g., activity 505).

In many embodiments, modeling module 422 can store computing instructions configured to run on one or more processing modules and perform one or more acts of methods 500 (FIG. 5) (e.g., activity 505). In several embodiments, modeling module 422 also can at least partially perform activity 710 (FIG. 7, described below) of modeling a webpage as a random field, activity 720 (FIG. 7, described below) of identifying a cyclic dependency in the undirected graph wherein the cyclic dependency involves at least three of the nodes, activity 740 (FIG. 7, described below) of breaking one or more of the edges of the undirected graph that connects the at least three of the nodes in the cyclic dependency, activity 730 (FIG. 7, described below) of selecting a configuration of a pair of nodes when the configuration converges before a number of the iterations conducted for the each pair of nodes exceeds a predetermined number of iterations, activity 735 (FIG. 7, described below) of selecting a configuration of a latest one of the iterations when the iterations do not result in convergence before a number of the iterations conducted for the each pair of nodes exceeds a predetermined number of iterations, activity 745 (FIG. 7, described below) of detecting a dead lock configuration between a first zone of a first node adjacent to a second zone of a second node in the undirected graph, activity 755 (FIG. 7, described below) of retrieving one or more historical dead lock configurations from a memory, activity 760 (FIG. 7, described below) of breaking the dead lock configuration by resetting a probability node of the dead lock configuration based on the one or more historical dead lock configurations, activity 765 (FIG. 7, described below) of initiating a random restart of an initial node selection of one or more historical dead lock configurations, activity 770 (FIG. 7, described below) of exploring the first zone of the first node in the undirected graph for other zones of the first node, and/or activity 775 (FIG. 7, described below) of breaking the dead lock configuration by exploiting one or more of the other zones of the first node.

In many embodiments, probability module 424 can store computing instructions configured to run on one or more processing modules and perform one or more acts of methods 500 (FIG. 5) (e.g., activity 510, activity 515, and/or activity 520). In several embodiments, modeling module 424 also can at least partially perform activity 780 (FIG. 7, described below) of determining a probability of the webpage having exceeded a predetermined threshold based on compatibility functions of the edges, as updated.

In some embodiments, image module 462 can store computing instructions configured to run on one or more processing modules and perform one or more acts of methods 500 (FIG. 5) (e.g., activity 525). In various embodiments, modeling module 462 also can at least partially perform activity 790 (FIG. 7, described below) of sending instructions to display the webpage based at least in part on the probability of the webpage having exceeded the predetermined threshold.

Figure 7A:
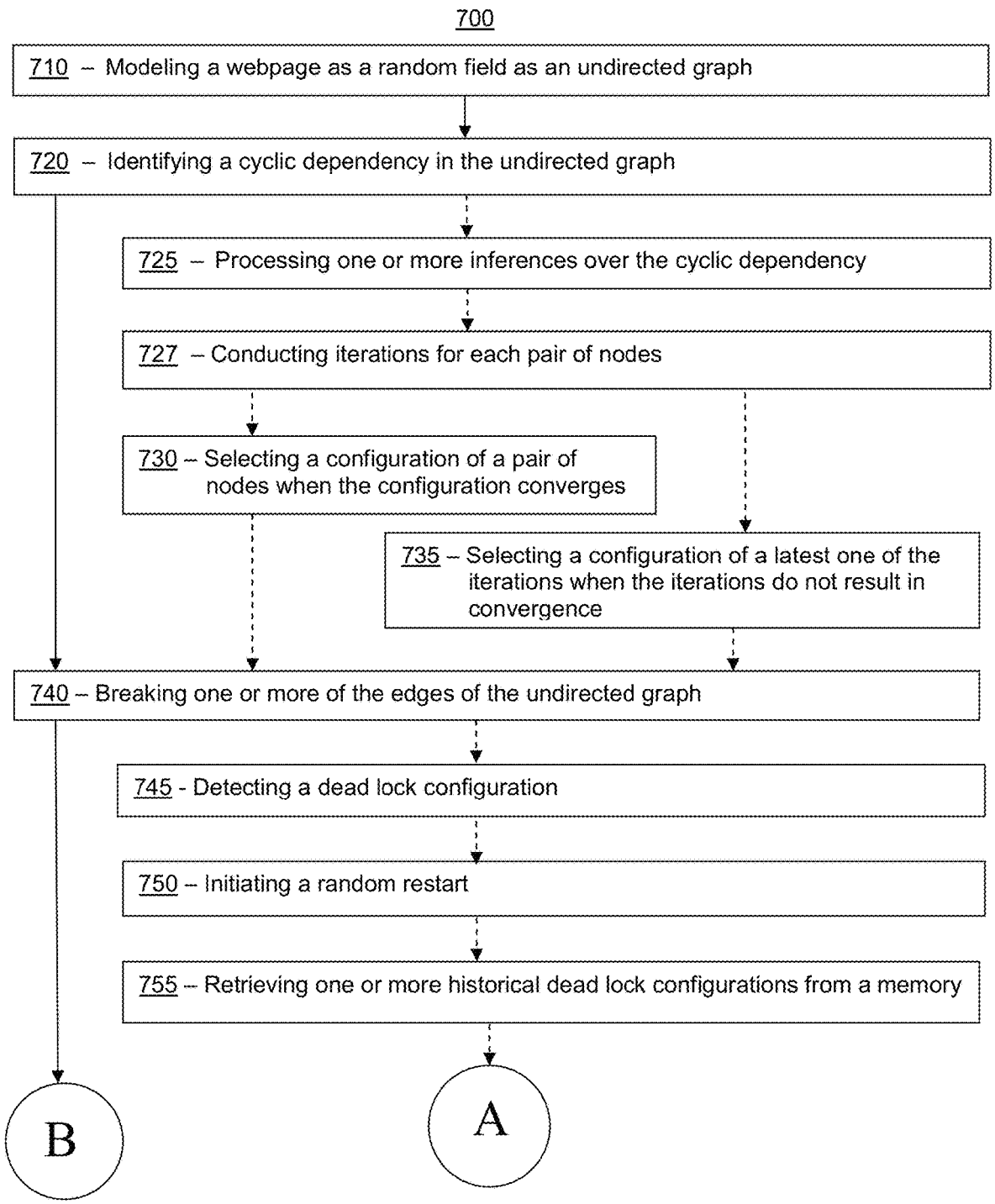
FIGS. 7A-7B illustrates a flowchart for a method, according to another embodiment.
Figure 7B:
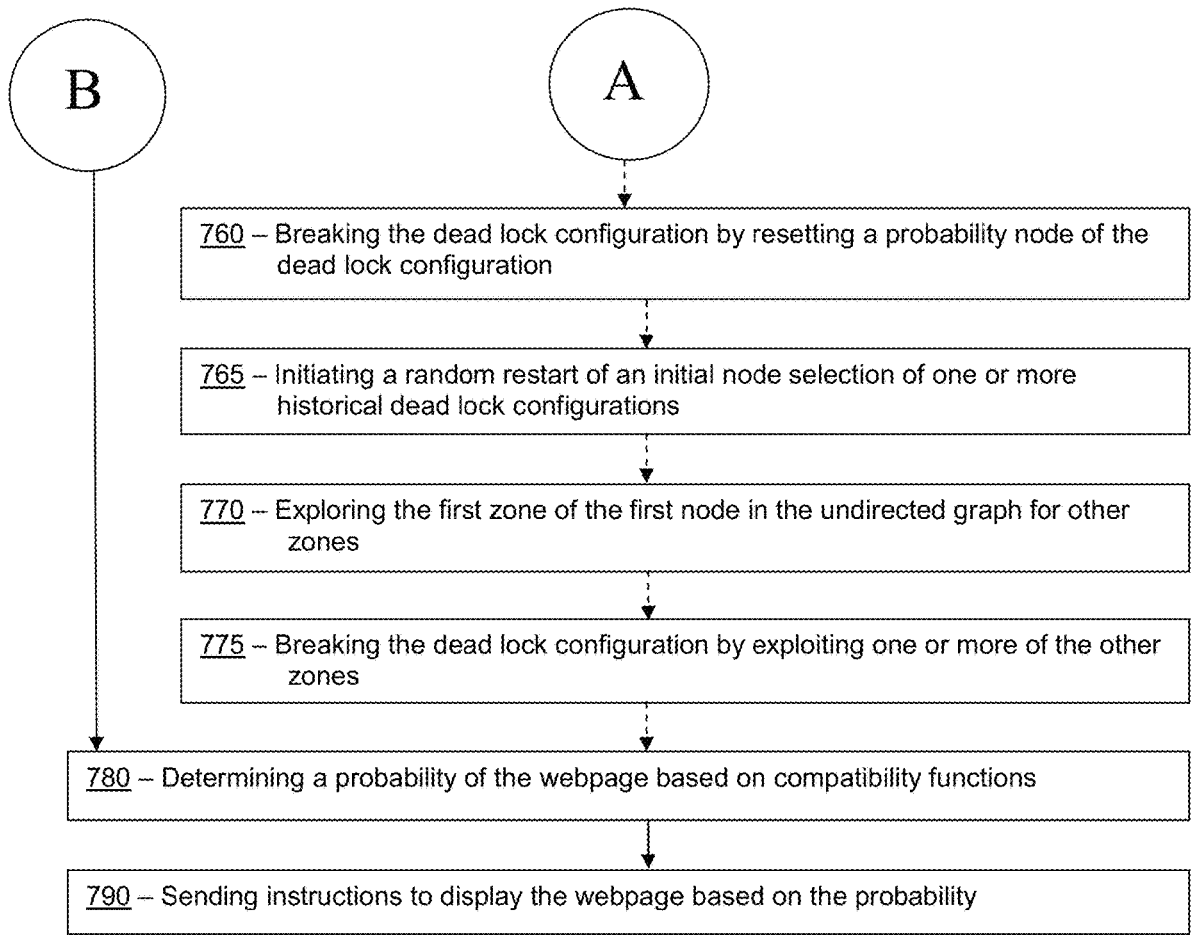

Turning ahead in the drawings, FIGS. 7A-7B illustrate a flowchart for a method 700, according to another embodiment. In some embodiments, method 700 can be a method of whole page personalization to personalize a web page associated with a cyclic dependency between one or more nodes in an undirected graph. In some embodiments, the method of whole page personalization to personalize the web page can be based on user intent, information from a search query (e.g., search terms) and/or other item activity, similar or identical to the procedures, processes, and/or activities of method 500 (FIG. 5). Method 700 is merely exemplary and is not limited to the embodiments presented herein. Method 700 can be employed in many different embodiments and/or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments one or more of the procedures, the processes, and/or the activities of method 700 can be combined or skipped. In several embodiments, system 300 (FIG. 3) can be suitable to perform method 700 and/or one or more of the activities of method 700. In various embodiments, portions of the procedures, processes, and/or activities of method 500 can be performed interchangeably as part of method 700 and vice versa.

In these or other embodiments, one or more of the activities of method 700 can be implemented as one or more computing instructions configured to run at one or more processors and configured to be stored at one or more non-transitory computer-readable media. Such non-transitory computer-readable media can be part of a computer system such as search system 310, personalization system 320, display system 360, and/or network 330. The processor(s) can be similar or identical to the processor(s) described above with respect to computer system 100 (FIG. 1).

Referring to FIG. 7, method 700 can include an activity 710 of modeling a webpage as a random field. In some embodiments, the random field can include an undirected graph comprising nodes and edges, as described below in connection with webpage as a random field with non-cyclic dependencies 800 (FIG. 8, described below) and/or webpage as a random field with cyclic dependencies 900 (FIG. 9, described below). Such an undirected graph comprising nodes and edges can be similar or identical undirected graph created by activity 505 (FIG. 5). In many embodiments, selecting the zones or placements that are compatible with each other can be based at least in part on a user profile of the user and/or other users, as described above in connection with activity 505 (FIG. 5, above). In several embodiments, the webpage as a random field can include a first order Markov graph and/or a graph in a planar layout with one or more zones appearing one after another in the undirected graph. In various embodiments, the terms zones and/or placements can be used interchangeably, where the zones and/or placements can be associated with each of the nodes in the undirected graph of the web page. In some embodiments, a first order Markov graph can form a chain of connected nodes where each node on the chain can be dependent on an adjacent node or a neighbor node. In many embodiments, modeling the webpage without dependency cycles can form an undirected graph with non-cyclic dependencies. In various embodiments, determining one or more compatible assets for one or more zones for each node can based on a set of available assets for a zone and/or a pool of available assets of a user, as described above in greater detail in connection with activities 505 and 510 (FIG. 5).

In many embodiments, the modeling the webpage in activity 505 (FIG. 5) and/or activity 710 can be determined using Equation 1 to estimate a maximum likelihood estimation that can determine the maximum entropy model. In various embodiments, modeling a webpage for a user also can include a selection process that can be used to select one or more assets for each zone corresponding to each node connected in the undirected graph. In some embodiments, such a selection process can be implemented by using a selection algorithm, as described below.

$$a_i = \text{argmax}_{r \in A} g(r)$$

where g is a goodness of an asset, C is a compatibility function, A is a set of all available pool of assets, an $a_i$ asset that is selected for a zone$_i$, where $A(a_1, \ldots, a_i)$=a set of available pool of assets compatible with $a_i$ after assets $a_1$ to $a_i$ are used, and Z=a set of zones 1 to n.

For each zone i in 2 to n: max score=0.

```
For r in A(a₁,..., aᵢ₋₁) : {
    asset_score = f(g(r), C(r, aᵢ₋₁))
    if (asset_score > max_score): {
        aᵢ = r
        max_score = asset_score
    }
}
```

In various embodiments, this selection algorithm can be based on a user profile, user preferences, user activities, and/or another suitable data point for the user. In many embodiments, the user profile can include a pool of assets of the user. The user profile can be similar or identical to the user profiles in activity 510 (FIG. 5).

In many embodiments, once the asset is selected for a zone, determining a compatible asset for an adjacent zone in the undirected graph can include analyzing a set of available pool of assets. The set of available pool assets can be gathered from a recent user activity, a current search query received by the user, and/or another suitable asset selected for a zone in the undirected graph for the user. Such a selection process of each zone that is compatible for an adjacent zone can be used for both modeling an undirected graph with non-cyclic dependencies (e.g., a planar graph) or cyclic dependencies (e.g., a non-planar graph), as described in connection with activity 505 (FIG. 5, above).

Figure 8:
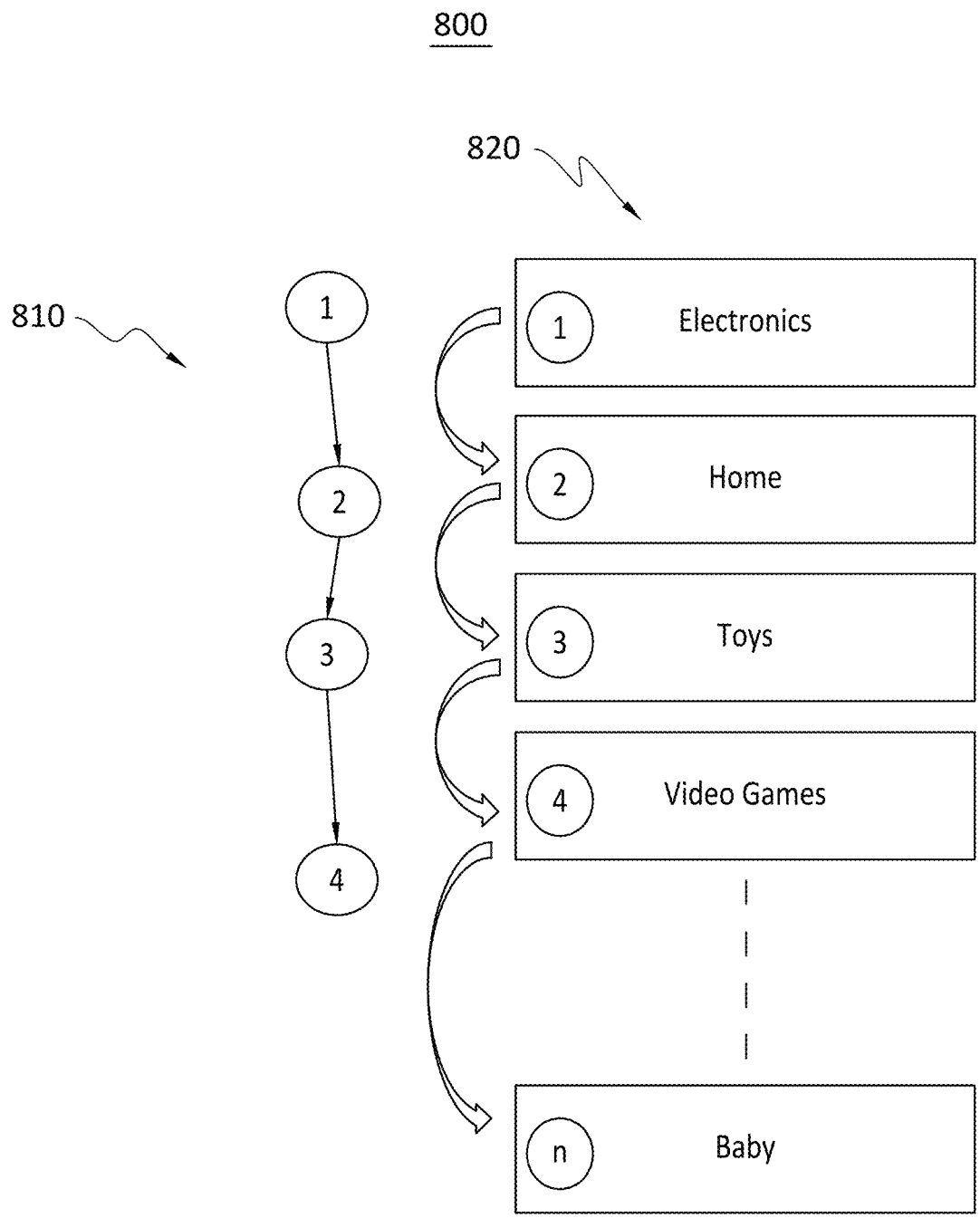
FIG. 8 illustrates an exemplary webpage as a random field with non-cyclic dependencies.
Figure 9:
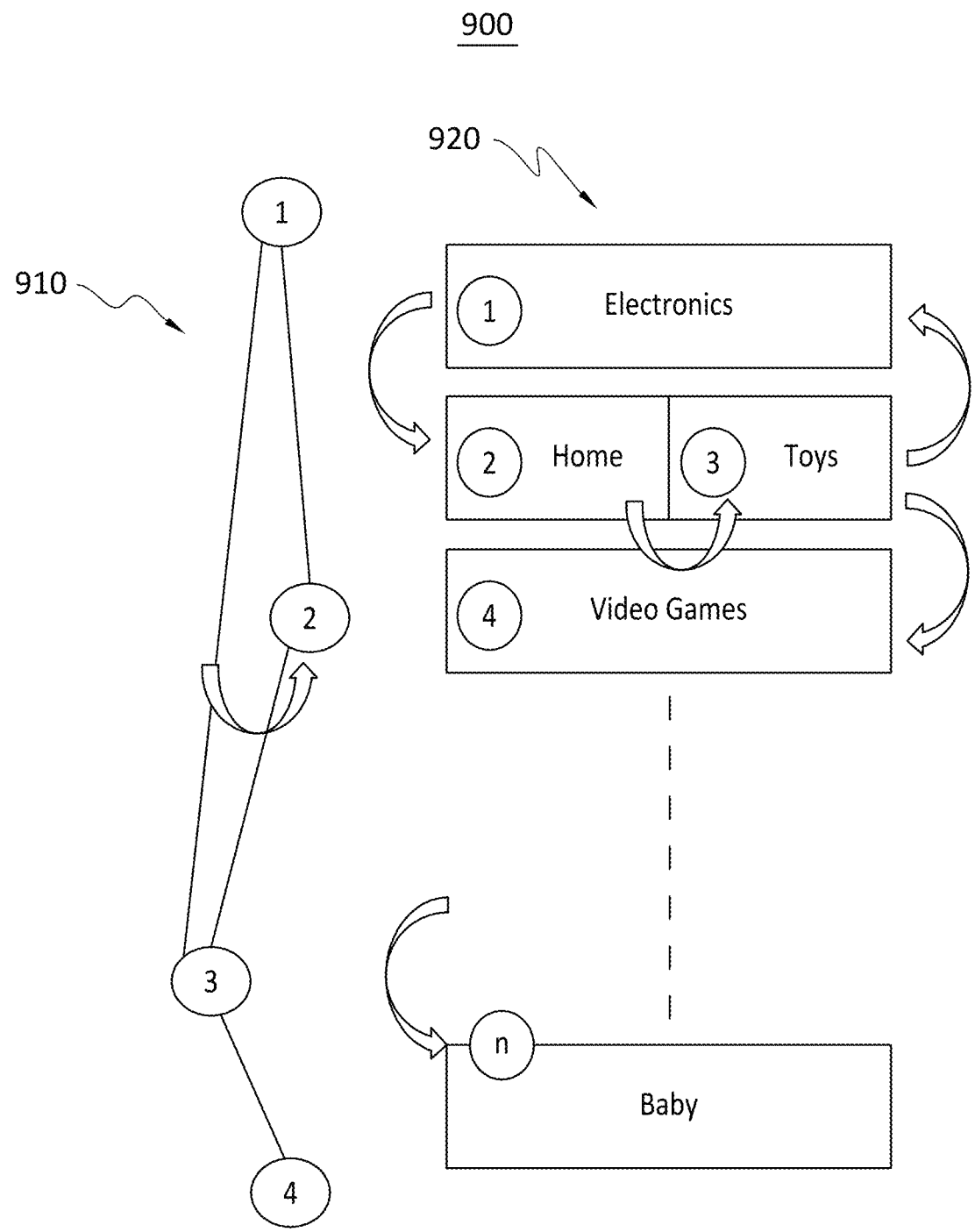
FIG. 9 illustrates an exemplary webpage as a random field with cyclic dependencies.

Turning ahead in the drawings, FIG. 8 illustrates an exemplary webpage as a random field with non-cyclic dependencies 800. Webpage as a random field with non-cyclic dependencies 800 is merely exemplary. In various embodiments, webpage as a random field with non-cyclic dependencies 800 can include an undirected graph representing an interactive webpage or a software application display. In a number of embodiments, webpage as a random field with non-cyclic dependencies 800 can include a planar graph 810 and a planar diagram 820. Webpage as a random field with non-cyclic dependencies 800 can be similar to webpage 600 (FIG. 6).

In several embodiments, planar graph 810 can include one or more zones and/or placements for each node in one or more nodes displayed in a planar layout for a webpage. Planar graph 810 illustrates an example of a first order Markov graph format with non-cyclic dependencies among each node. In many embodiments, the one or more zones in the one or more nodes can be connected in a chain or a sequential order where every node is dependent on an adjacent node and/or a neighbor node illustrating a graph with non-cyclic dependencies. In some embodiments, selecting the one or more zones from a top node down to a bottom node can include selecting and/or inferring each zone is compatible with a neighbor node. Selecting the one or more zones can be similar or identical to activity 505 (FIG. 5), activity 510 (FIG. 5), and/or activity 710 (FIG. 7). For example, a planar graph with non-cyclical dependencies with 4 zones can be connected by one or more edges from top zone 1 to bottom zone n. The relationship showing the connectivity of each zone in planar graph 810 can include: zone 1 dependent on zone 2, zone 2 dependent on zone 1, zone 2 dependent on zone 3, zone 3 dependent on zone 2, zone 3 dependent on zone 4, and zone 4 dependent on zone 3. In another example, a planar graph can include another suitable number of zones, n, where each zone of the n number of zones can depend on, infer from, or be compatible with a neighbor zone in an order from top to bottom.

Planar diagram 820 illustrates an exemplary type of zone and/or type of placement displayed in a webpage. Planar diagram 820 can include 4 diagram boxes with 4 exemplary types of zones describing each node, where each node can include one or more different zones associated with each node. For example, zone 1 in planar graph 810 can include an electronics category in diagram box 1 corresponding to planar diagram 820, and so on for diagram boxes 2 to 4. In following with the planar graph display format, diagram box 1 for the electronics category can be compatible with a zone in diagram box 2 for a home category, diagram box 2 for the home category can be compatible with a zone in diagram box 3 for a toys category, and diagram box 3 can be compatible with a zone from diagram box 4 a video games category.

Returning to FIG. 7, in some embodiments, method 700 also can include an activity 720 of identifying a cyclic dependency in the undirected graph. In many embodiments, the cyclic dependency involves at least three of the nodes. In some embodiments, selecting assets from more than one zone can include an incompatible asset of a neighboring zone in the undirected graph. In various embodiments, resolving a cyclic dependency identified can allow activity 505 (FIG. 5) and activity 510 (FIG. 5) to be implemented.

In several embodiments, the cyclic dependency in the undirected graph of activity 720 optionally can include a set of nodes that can influence more than one of the at least three of the nodes in the undirected graph. In many embodiments, a first node can influence both a second node and a third node, and wherein the third node influences both the first node and the second node, as described below in connection with non-planar graph 910 (FIG. 9) and non-planar diagram 920 (FIG. 9). For example, a cyclic dependency can occur when zone 1 can influence a selection from either zone 2 or a selection from zone 3 and vice versa for both zone 2 and zone 3. In such a configuration, a webpage can include a compatible asset from zone 1 to zone 2 and an incompatible asset from zone 2 to zone 3 since each zone can depend on more than one other zone in the graph.

Turning ahead in the drawings, FIG. 9 illustrates an exemplary webpage as a random field with cyclic dependencies 900. Webpage as a random field with cyclic dependencies 900 is merely exemplary. In various embodiments, webpage as a random field with cyclic dependencies 900 can include an undirected graph representing an interactive webpage or a software application display. In a number of embodiments, webpage as a random field with cyclic dependencies 900 can include a non-planar graph 910 and a non-planar diagram 920.

In several embodiments, non-planar graph 910 can be a planar layout for a webpage, such as a first order Markov graph, similar to planar graph 810 (FIG. 8) and/or planar diagram 820 (FIG. 8). Non-planar graph 910 illustrates a configuration for a graph with cyclic dependencies. Cyclic dependency can occur whether or not the zones that are dependent on more than one other zone are adjacent or neighbor zones in a graph. For example, a graph with cyclic dependencies can have 4 zones associated with 4 nodes, where zone 1 can be connected with one or more edges to zone 2 and to zone 3, and where zone 2 also can be connected to zone 3, and where zone 3 can be connected to zone 4. In this example, zones 1, 2, and 3 can form a complex graph format with cyclic dependencies.

Non-planar diagram 920 illustrates an exemplary type of zone and/or type of placement of each of 4 zones displayed in a webpage. Non-planar diagram 920 can include 4 diagram boxes with 4 exemplary zones for more than one node, where each node can include one or more different zones associated with each node. For example, zone 1 in non-planar graph 910 can include an electronics category in diagram box 1 of non-planar diagram 920, and so on for non-planar diagram boxes 2 to 4. In following with the non-planar diagram graph display format, diagram box 1 for the electronics category can be compatible with a zone in diagram box 2 for a home category and a zone in diagram box 3 for a toys category. Diagram box 2 for the home category can be compatible with zone 3 and zone 1. Diagram box 3 can be compatible with diagram box zone 1 and diagram box for zone 4 for a video games category.

Returning to FIG. 7, upon identifying the cyclic dependency in the undirected graph, method 700 also optionally can include an activity 725 of processing one or more inferences over the cyclic dependency for each of the at least three nodes. In several embodiments, activity 725 of processing the one or more inferences over the cyclic dependency can be implemented using a selection process to select one or more assets for each zone corresponding to each node connected in the undirected graph, such a selection process can be similar or identical to modeling a webpage using the selection process in activity 505 (FIG. 5) and/or activity 710 (FIG. 7). In various embodiments, the terms inferences and/or dependencies can be used interchangeably, where the inferences and/or dependencies can be associated with the selection process to select one or more assets for each zone corresponding to each node connected in the undirected graph.

In many embodiments method 700, additionally optionally can include an activity 727 of conducting iterations for each pair of nodes of the at least three nodes. For example, each node in the cyclic dependency can be set to be dependent on a previous node for a single iteration of the processing step. As an example, zone 1 can be set to zone 2, zone 2 can be set to zone 3, and zone 3 can be set to zone 1 to form the single iteration to be processed. After each iteration has been processed, activity 727 can include repeating the cycle for multiple iterations to process the one or more inferences over the cyclic dependency.

In some embodiments, conducting multiple iterations for each pair of nodes can be based on using the following algorithm:

$a_k^i = \mathrm{argmax}\, f(g(r), C(r, a_k^z))$ where $r \in A$ where U: for K iterations and Y: for each zone i in Z,
If for all i in Z ($a_k^i == a_{k-1}^i$) break from U,
where $a_k^i$ refers to an asset that is selected for $zone_i$ in kth iteration;
z refers to a zone that $zone_i$ is dependent upon;
g refers to a goodness of asset;
C refers to a compatibility function;
Z indicates a set of zones with a cyclic dependency; and
A indicates a set of available pool of assets.

In some embodiments, method 700 further optionally can include an activity 730 of selecting a configuration of a pair of nodes when the configuration converges before a number of the iterations conducted for the each pair of nodes exceeds a predetermined number of iterations.

In other embodiments, instead of activity 730, method 700 additionally optionally can include an activity 735 of selecting a configuration of a latest one of the iterations when the iterations do not result in convergence before a number of the iterations conducted for the each pair of nodes exceeds a predetermined number of iterations.

In a number of embodiments, method 700 further can include an activity 740 of breaking one or more of the edges of the undirected graph that connects the at least three of the nodes in the cyclic dependency. When the one or more edges are broken, those edges are removed from the graph, such that such one or more edges are no longer part of the edges of the graph.

In some embodiments, activity 740 optionally can include breaking the one or more edges of the undirected graph connecting a pair of nodes of the at least three of the nodes representing content located below a fold of the webpage. In a number of embodiments, one or more assets of a zone loaded on a webpage that is visible to users can include zones located above the fold (ATF). In many embodiments, one or more assets of a zone loaded onto a webpage not visible to a user can include zones below the fold (BTF). In some embodiments, one or more assets of a zone BTF can be viewed by scrolling down the webpage. In many embodiments, breaking the one or more edges of the undirected graph BTF can remove cycles of dependencies in a cyclic dependency configuration by reducing a number of zones that are dependent upon each other. In various embodiments, breaking the one or more edges can include a cyclic dependency configuration between a zone ATF and a zone BTF.

In many embodiments, whenever a cyclic dependency between a zone AFT and a zone BTF is observed, breaking the edges between the zone AFT connected to the zone BTF can resolve the cyclic dependency configuration. In some embodiments, breaking the edges below the fold can include assumptions that a zone ATF and a zone BTF can be independent of each other in order to reduce a number of zones that can have cyclic dependency. In several embodiments, reducing the cyclic dependency can allow the system to process one or more inferences over the cyclic dependency and reach a convergence resolving the cyclic dependency, processing one or more inferences over the cyclic dependency can be similar or identical to conducting iterations of activities 725, 727, and 730. In the example, zone 1 for electronics is dependent on zone 2 for home where both zones are dependent on each other and viewed ATF. Zone 1 for electronics is also dependent on zone 4 for video games where zone 1 is ATF and zone 4 is BTF. In this configuration, breaking the one or more edges between zone 1 and zone 4 can reduce the number of dependencies on zone 1 resolving the cyclic dependency configuration.

Figure 10:
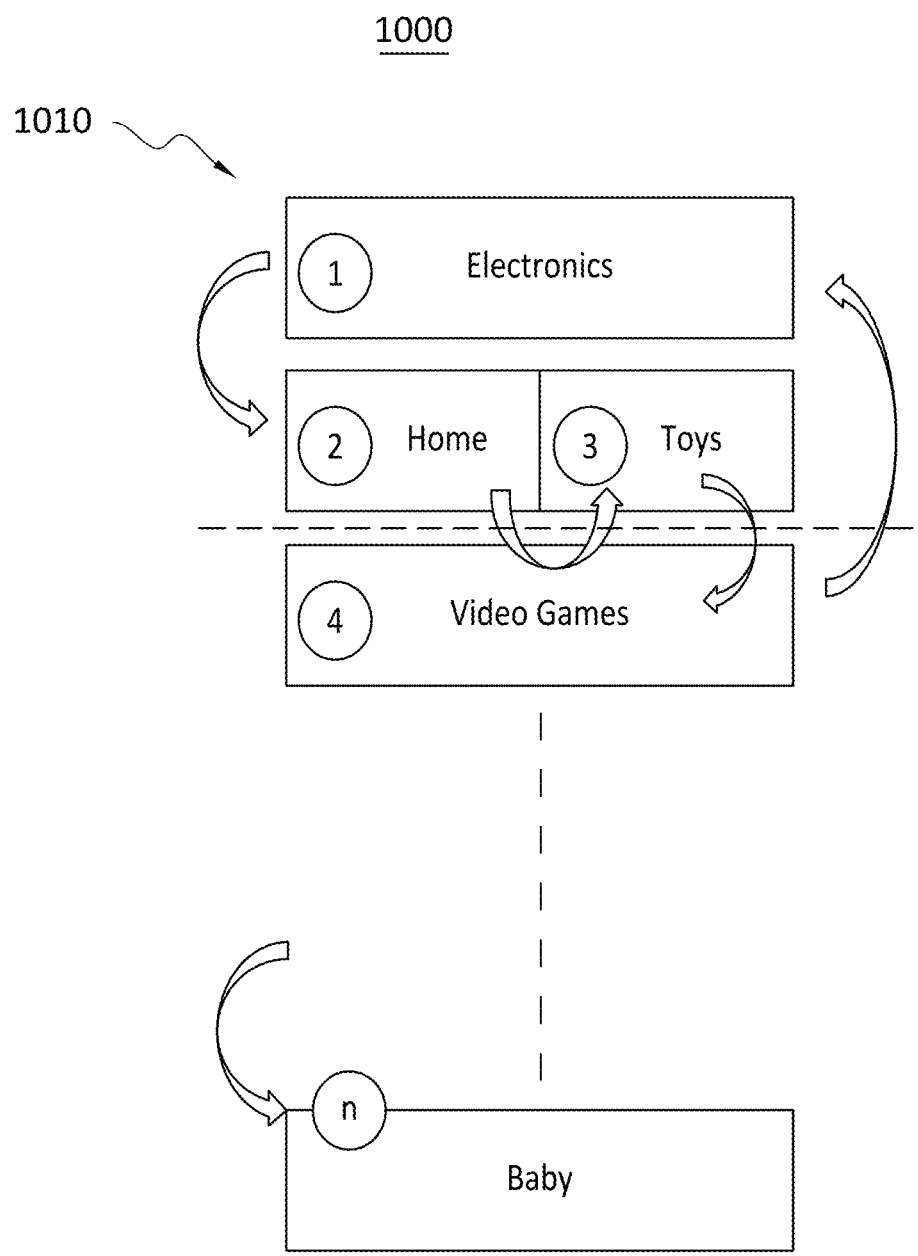
FIG. 10 illustrates an exemplary webpage as a random field with cyclic dependencies.

Turning ahead in the drawings, FIG. 10 illustrates an exemplary webpage as a random field with non-cyclic dependencies 1000. Webpage as a random field with non-cyclic dependencies 1000 is merely exemplary. In various embodiments, webpage as a random field with non-cyclic dependencies 1000 can include a diagram representing an interactive webpage or a software application display. In a number of embodiments, webpage as a random field with non-cyclic dependencies 1000 can include a non-planar diagram 1010.

Non-planar diagram 1010 illustrates one or more zones of one or more nodes displayed ATF (e.g., zones 1, 2, and 3) and a zone of a node displayed BTF (e.g., zone 4). Non-planar diagram 1010 illustrates a graph with a cyclic dependency between a zone ATF and a zone BTF. In such a configuration, breaking one or more edges between a zone ATF and a zone BTF can resolve the cyclic dependency between the zones allowing a graph to be displayed with non-cyclic dependencies between each zone and each neighbor zone.

Returning to the drawings in FIG. 7, in many embodiments, method 700 also optionally can include an activity 745 of detecting a dead lock configuration between a first zone of a first node adjacent to a second zone of a second node in the undirected graph. In several embodiments, the first zone and the second zone can be incompatible zones. In some embodiments, activity 745 of detecting a dead lock configuration can be determined based on a set of variables for an algorithm, such as, A=a set of all available pool of assets, $A(a_1, \ldots, a_i)$=a set of available pool of assets compatible with $a_i$ after assets $a_1$ to $a_i$ are used, and Z=set of zones 1 to n.

In several embodiments, detecting the dead lock configuration can be determined by using the following algorithm:

```
a₁ = argmax_{r ∈ A} g(r)
where for each zone i in 2 to n: max_score = 0 and
    for r in A(a₁,..., a_{i-1}) : {
        asset_score = f(g(r), C(r, a_{i-1}))
        if (asset_score > max_score): {
            a_i = r
            max_score = asset_score
        }
    }
```

In many embodiments, set $A(a_1, \ldots, a_{i-1})$ will become empty when there is no asset available which is compatible with $a_{i-1}$ which can cause a dead lock configuration. Such a dead lock configuration can occur when the there is no current selection of a compatible asset(s) for each of the remaining zone(s) in the undirected graph.

In some embodiments, the selection process to select assets for every position on a webpage can be conditioned upon each previous assignment. In many embodiments, a selection process can include two competing constraints (e.g., incompatible zones or placements), such as: a goodness function of an asset for a current position on the webpage and a compatibility score of each of one or more edges of an asset with at least one neighbor asset. For example, based on an assignment to a zone k, if none of the available assets for a selection for a zone k+1 is compatible with zone k, the selection for zone k+1 cannot be possible. As another example, based on the previous assignments to a webpage for a user, a category for "baby food" can be compatible for 2 categories from an available pool of assets for the user, such as: "electronics" and "home furniture." If zone k is assigned a banner about "baby food" and the only assets available for zone k+1 include advertisements for "motor oil" or "weed killers," a selection based on the available pool of assets for zone k+1 is incompatible, thus the inference from zone k to zone k+1 fails.

In a number of embodiments, upon detection of the dead lock configuration, method 700 additionally optionally can include an activity 750 of initiating a random restart of an initial node selection based on at least a weighted random sampling of the nodes in the undirected graph. In many embodiments, the random restart approach can include selected at random or randomizing an initial node selection. In some embodiments each of the nodes in the undirected graph can be given a weighted score using a weighted random sampling approach. In various embodiments, an advantage of using the weighted random sampling approach can include increasing the likelihood that the nodes with higher goodness functions that other goodness functions across other nodes can be selected when using the random restart approach to break the dead lock situation.

In several embodiments, resolving the dead lock can include a random restart approach, based on the following random restart algorithm:

```
a₁ = argmax_{r ∈ A} g(r)
where, i = 2;
Do {
    max_score = 0
    For r in A(a₁,..., a_{i-1}) : {
        asset_score = f(g(r), C(r, a_{i-1}))
        if (asset_score > max_score): {
            a_i = r
            max_score = asset_score
        }
    }
    if A(a₁,..., a_i) is empty { //detected deadlock
        restartZone = getRandom(i-1, 1);
        if(restartZone == 1) {
            a_{restartZone} = weighted_random_sampled_asset (g(r))
        } else {
            a_{restartZone} = weighted_random_sampled_asset
            (f(g(r), C(r, a_{i-1})))
        }
        i=restartZone + 1
    } else {
        i++;
    }
} While (i <= n).
```

In some embodiments, each zone can include multiple assets of which only one asset, as selected, can be displayed for each node. In several embodiments, the random restart approach can include a random sampling step by first randomly selecting a zone (e.g., a restart zone) from among the zones that created the dead lock configuration to revert back or restart the selection process over using other assets from the zone. In many embodiments, starting from the restart zone (e.g., randomly selected zone), the random restart algorithm can select an asset with a higher goodness function and a higher compatibility score of each of the one or more edges over by using other assets in the node. In several embodiments, the system can implement and/or run a new iteration of the selection process using the new asset to resolve the dead lock configuration. In many embodiments, in the event the new asset creates another dead lock configuration, the random restart approach can continue the process with other nodes in the undirected graph. Such an initial selection process of zones can be similar or identical to the initial selection procedures, processes, and/or activities used to model the webpage page as a random field in activity 505 (FIG. 5) and/or activity 510 (FIG. 5).

In some embodiments, after detection of the dead lock configuration, method 700 also optionally can include an activity 755 of retrieving one or more historical dead lock configurations from a memory.

In many embodiments, after detection of the dead lock configuration, method 700 additionally optionally can include an activity 760 of breaking the dead lock configuration by resetting a probability node of the dead lock configuration based on the one or more historical dead lock configurations.

In various embodiments, after detection of the dead lock configuration, method 700 further optionally can include an activity 765 of initiating a random restart of an initial node selection of one or more historical dead lock configurations. In some embodiments, initiating the random restart with memory (e.g., historical dead lock configurations) can be similar to activity 505 (FIG. 5) and/or activity 510 (FIG. 5). In various embodiments, the random restart with memory can be similar to activity 750, with the exception that a random restart with memory algorithm described below can keep track of historical asset selections that previously led to historical dead lock configurations so as not to select a same or a similar asset combination from the historical asset selections.

In many embodiments, resolving the dead lock can include the random restart with memory approach:

```
a₁ = argmax_{r ∈ A} g(r)
where i = 2;
Do {
    max_score = 0
    For r in A(a₁,..., a_{i-1}) : {
        asset_score = f(g(r), C(r, a_{i-1}))
        if (asset_score > max_score): {
            a_i = r
            max_score = asset_score
        }
    }
    if A(a₁,..., a_i) is empty { //detected deadlock
        A(a₁,..., a_{i-1}) = A(a₁,..., a_{i-1}) − a_i // Memorize that a_i leads to deadlock given (a₁,..., a_{i-1})
        restartZone = getRandom(i−1, 1);
        if(restartZone == 1) {
            a_{restartZone} = weighted_random_sampled_asset (g(r))
        } else {
            a_{restartZone} = weighted_random_sampled_asset
                (f(g(r), C(r, a_{i-1})))
        }
        i = restartZone + 1
    } else {
        i++;
    }
} While ( i <= n)
```

In various embodiments, the random restart with memory algorithm can include a random sampling step by first randomly selecting a zone (e.g., a restart zone) from among the zones that created the dead lock configuration to revert back or restart the selection process over using other assets from the zone. In some embodiments, the set of available pool assets can be updated by removing and/or flagging the asset combinations that ended up or generated dead lock configurations. In many embodiments, starting from the restart zone (e.g., randomly selected zone), the random restart with memory algorithm can select an asset with a higher goodness function and a higher compatibility score of each of the one or more edges over other assets in the node. In several embodiments, the system can implement and/or run a new iteration of the selection process using the new asset to resolve the dead lock configuration. In many embodiments, in the event the new asset creates another dead lock configuration, the random restart approach can continue the process with other nodes in the undirected graph. Such an initial selection process of zones can be similar or identical to the initial selection procedures, processes, and/or activities used to model the webpage page as a random field in activity 505 (FIG. 5) and/or activity 510 (FIG. 5).

In a number of embodiments, after detection of the dead lock configuration, method 700 also optionally can include an activity 770 of exploring the first zone of the first node in the undirected graph for other zones of the first node.

In some embodiments, after detection of the dead lock configuration, method 700 further optionally can include an activity 775 of breaking the dead lock configuration by exploiting one or more of the other zones of the first node. In many embodiments, the one or more other zones are compatible zones between the first node and the second node.

In many embodiments, resolving the dead lock configuration can include an explore and exploit approach, based on using the following explore/exploit algorithm:

```
a₁ = argmax_{r ∈ A} g(r)
where exploreExploit=false;
i = 2;
Do {
    if(exploreExploit) {
        a_i = EE_weighted_random_sample(A− {a₁,..., a_{i-1}});
    } else {
        max_score = 0
        For r in A(a₁,..., a_{i-1}) : {
            asset_score = f(g(r), C(r, a_{i-1}))
            if (asset_score > max_score): {
                a_i = r
                max_score = asset_score
            }
        }
        if A(α₁,..., a_i) is empty { //detected deadlock
            exploreExploit =true;
        }
    }
} While ( i <= n)
```

In many embodiments, resolving dead lock configuration can begin by using the explore/exploit algorithm to select a new asset of the node by selecting a score for user behavior (e.g., the user profile of the user and/or recent item activity of the user) for each asset. In some embodiments, the explore/exploit algorithm can use previous activities and/or behavior of one or more users to assign a score for each asset based a predetermined number of user activities, such user activities can include an average click through rate, an average conversion rate, and/or another suitable user activity data point. In various embodiments, based on explore/exploit scores previously assigned to the assets of each node, the explore/exploit algorithm also can use a weighted random sampling of each asset in the set of available assets to run a predetermined number of iterations for each asset in the set of available assets.

In several embodiments, method 700 also can include activity 780 of determining a probability of the webpage having exceeded a predetermined threshold based on compatibility functions of the edges, as updated, which can be similar to activity 510 (FIG. 5).

In some embodiments, activity 780 optionally can include compatibility functions that can quantify compatibility of the edges based on one or more goodness functions of pairs of the nodes, as described in connection with activities 505 and 510 (FIG. 5).

In many embodiments, method 700 additionally can include an activity 790 of sending instructions to display the webpage based at least in part on the probability of the webpage having exceeded the predetermined threshold, which can be similar to activity 525 (FIG. 5).

In a number of embodiments, the techniques described herein can solve a technical problem that arises only within the realm of computer networks, as modeling a webpage personalized for each user to create online orders do not exist outside the realm of computer networks. Moreover, the techniques described herein can solve a technical problem that cannot be solved outside the context of computer networks. Specifically, the techniques described herein cannot be used outside the context of computer networks, in view of a lack of data, and because the machine learning model cannot be performed without a computer.

In many embodiments, the machine learning model can be pre-trained, but can also consider both historical and dynamic input from each event with current data in each time slot. In many embodiments, the technique described herein can allow the machine learning to train itself to learn with each iteration.

Although systems and methods for whole page personalization with cyclic dependencies have been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the activities of FIGS. 5 and 7 may include different activities and/or be performed by many different modules, in many different orders. As another example, one or more of the procedures, processes, and/or activities of one of FIGS. 5 and 7 can be performed in another one of FIGS. 5 and 7. As another example, the systems within system 300 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed:

1. A system comprising:
one or more processors; and
one or more non-transitory computer-readable media storing computing instructions that, when executed on the one or more processors, cause the one or more processors to perform operations comprising:
reconfiguring a webpage as an undirected graph;
identifying a cyclic dependency in the undirected graph, wherein the cyclic dependency comprises a set of nodes of the undirected graph;
iterating processing one or more inferences over the cyclic dependency for each pair of the nodes of the set of the nodes;
breaking one or more edges of the undirected graph, wherein the one or more edges couple together the set of the nodes;
determining, based at least in part on compatibility functions of the one or more edges remaining after breaking the one or more of the edges, a probability of the webpage having exceeded a predetermined threshold to cause a user to take an action; and
sending instructions to display the webpage.

2. The system of claim 1, wherein the cyclic dependency in the undirected graph further comprises:
connecting nodes that influence more than one of the set of the nodes in the undirected graph, wherein a first node influences both a second node and a third node, and wherein the third node influences both the first node and the second node, wherein the set of the nodes comprise the first, second, and third nodes, wherein the nodes comprise the set of the nodes, and wherein each node of the set of the nodes in the cyclic dependency is dependent on a respective previous node for a respective single iteration of the one or more inferences.

3. The system of claim 1, wherein iterating processing the one or more inferences over the cyclic dependency comprises:
after an initial iteration is processed, repeating a new iteration cycle for iterations to process the one or more inferences over the cyclic dependency.

4. The system of claim 3, wherein the computing instructions, when executed on the one or more processors, further cause the one or more processors to perform an operation comprising:
selecting a configuration of a pair of the nodes when the configuration of the pair of the nodes converges before a respective number of the iterations conducted for each pair of the nodes exceeds a predetermined number of the iterations.

5. The system of claim 3, wherein the computing instructions, when executed on the one or more processors, further cause the one or more processors to perform an operation comprising:
selecting a configuration of a latest one of the iterations when the iterations do not result in convergence before a respective number of the iterations conducted for each pair of the nodes exceeds a predetermined number of the iterations.

6. The system of claim 1, wherein breaking the one or more of the edges of the undirected graph comprises:
connecting a pair of the nodes of the set of the nodes representing content located below a fold of the webpage.

7. The system of claim 1, wherein the computing instructions, when executed on the one or more processors, further cause the one or more processors to perform an operation comprising:
detecting a dead lock configuration between a first zone of a first node adjacent to a second zone of a second node in the undirected graph, wherein the first zone and the second zone are incompatible zones, and wherein the set of the nodes comprise the first and second nodes.

8. The system of claim 7, wherein the computing instructions, when executed on the one or more processors, further cause the one or more processors to perform operations comprising, upon detection of the dead lock configuration:
initiating a random restart of an initial node selection based on at least a weighted random sampling of the nodes in the undirected graph;
retrieving one or more historical dead lock configurations from a memory;

breaking the dead lock configuration by resetting a probability node of the dead lock configuration based on the one or more historical dead lock configurations; and initiating a random restart of an initial node selection of the one or more historical dead lock configurations.

9. The system of claim 7, wherein the computing instructions, when run on the one or more processors, further cause the one or more processors to perform operations comprising, upon detection of the dead lock configuration:

exploring the first zone of the first node in the undirected graph for other zones of the first node; and breaking the dead lock configuration by exploiting one or more of the other zones of the first node, wherein the one or more of the other zones are compatible zones between the first node and the second node.

10. The system of claim 1, wherein the compatibility functions quantify compatibility of the one or more edges based on one or more goodness functions of pairs of the nodes.

11. A method being implemented via execution of computing instructions configured to run on one or more processors and stored on one or more non-transitory computer-readable media, the method comprising: reconfiguring a webpage as an undirected graph;

identifying a cyclic dependency in the undirected graph, wherein the cyclic dependency comprises a set of nodes of the undirected graph;

iterating processing one or more inferences over the cyclic dependency for each pair of the nodes of the set of the nodes;

breaking one or more of edges of the undirected graph, wherein the one or more edges couple together the set of the nodes;

determining, based at least in part on compatibility functions of the one or more edges remaining after breaking the one or more of the edges, a probability of the webpage having exceeded a predetermined threshold to cause a user to take an action; and sending instructions to display the webpage.

12. The method of claim 11, wherein the cyclic dependency in the undirected graph further comprises:

connecting nodes that influence more than one of the set of the nodes in the undirected graph, wherein a first node influences both a second node and a third node, and wherein the third node influences both the first node and the second node, wherein the set of the nodes comprise the first, second, and third nodes, wherein the nodes comprise the set of the nodes, and wherein each node of the set of the nodes in the cyclic dependency is dependent on a respective previous node for a respective single iteration of the one or more inferences.

13. The method of claim 11, wherein iterating processing the one or more inferences over the cyclic dependency comprises:

after an initial iteration is processed, repeating a new iteration cycle for iterations to process the one or more inferences over the cyclic dependency.

14. The method of claim 13 further comprising:

selecting a configuration of a pair of the nodes when the configuration of the pair of the nodes converges before a respective number of the iterations conducted for each pair of the nodes exceeds a predetermined number of the iterations.

15. The method of claim 13 further comprising:

selecting a configuration of a latest one of the iterations when the iterations do not result in convergence before a respective number of the iterations conducted for each pair of the nodes exceeds a predetermined number of the iterations.

16. The method of claim 11, wherein breaking the one or more of the edges of the undirected graph comprises:

connecting a pair of the nodes of the set of the nodes representing content located below a fold of the webpage.

17. The method of claim 11, further comprising:

detecting a dead lock configuration between a first zone of a first node adjacent to a second zone of a second node in the undirected graph, wherein the first zone and the second zone are incompatible zones, and wherein the set of the nodes comprise the first and second nodes.

18. The method of claim 17 further comprising, upon detection of the dead lock configuration:

initiating a random restart of an initial node selection based on at least a weighted random sampling of the nodes in the undirected graph;

retrieving one or more historical dead lock configurations from a memory;

breaking the dead lock configuration by resetting a probability node of the dead lock configuration based on the one or more historical dead lock configurations; and initiating a random restart of an initial node selection of the one or more historical dead lock configurations.

19. The method of claim 17 further comprising, upon detection of the dead lock configuration:

exploring the first zone of the first node in the undirected graph for other zones of the first node; and breaking the dead lock configuration by exploiting one or more of the other zones of the first node, wherein the one or more of the other zones are compatible zones between the first node and the second node.

20. The method of claim 11, wherein the compatibility functions quantify compatibility of the one or more edges based on one or more goodness functions of pairs of the nodes.

* * * * *